US008278400B2

(12) United States Patent
Chisholm et al.

(10) Patent No.: US 8,278,400 B2
(45) Date of Patent: Oct. 2, 2012

(54) ANTIFOULING MATERIALS CONTAINING CATIONIC POLYSILOXANES

(75) Inventors: Bret Ja Chisholm, West Fargo, ND (US); Philip Boudjouk, Fargo, ND (US); Johnson Thomas, Aurora, OH (US); David Allen Christianson, Fargo, ND (US); Shane Jeremy Stafslien, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 145 days.

(21) Appl. No.: 12/763,818

(22) Filed: Apr. 20, 2010

(65) Prior Publication Data

US 2010/0204399 A1 Aug. 12, 2010

Related U.S. Application Data

(62) Division of application No. 11/429,923, filed on May 8, 2006, now Pat. No. 7,771,833.

(60) Provisional application No. 60/751,720, filed on Dec. 17, 2005, provisional application No. 60/743,044, filed on Dec. 15, 2005, provisional application No. 60/679,129, filed on May 9, 2005.

(51) Int. Cl.
*C08G 77/42* (2006.01)

(52) U.S. Cl. ........................ 525/474; 428/447

(58) Field of Classification Search .................. 428/447; 525/474
See application file for complete search history.

(56) References Cited

U.S. PATENT DOCUMENTS

| | | | |
|---|---|---|---|
| 4,125,491 A | 11/1978 | Gorman | |
| 4,298,543 A | 11/1981 | Law et al. | |
| 4,400,288 A | 8/1983 | Dhanani et al. | |
| 4,417,066 A | 11/1983 | Westall | |
| 4,687,813 A | 8/1987 | Lenz et al. | |
| 4,697,913 A | 10/1987 | Kuramoto et al. | |
| 4,895,964 A | 1/1990 | Margida | |
| 4,902,767 A | 2/1990 | Roitman et al. | |
| 4,910,252 A | 3/1990 | Yonehara et al. | |
| 4,933,178 A | 6/1990 | Capelli | |
| 5,001,210 A | 3/1991 | Coury et al. | |
| 5,019,096 A | 5/1991 | Fox, Jr. et al. | |
| 5,049,684 A | 9/1991 | Tomibe et al. | |
| 5,135,742 A | 8/1992 | Halloran et al. | |
| 5,203,991 A | 4/1993 | Kutsuna et al. | |
| 5,237,082 A | 8/1993 | Leir et al. | |
| 5,260,400 A | 11/1993 | Karydas | |
| 5,498,644 A | 3/1996 | Reo | |
| 5,602,224 A | 2/1997 | Vrckovnik et al. | |
| 5,641,855 A | 6/1997 | Scherr et al. | |
| 5,986,018 A | 11/1999 | Yamaguchi et al. | |
| 6,030,632 A | 2/2000 | Sawan et al. | |
| 6,099,897 A | 8/2000 | Sayo et al. | |
| 6,124,427 A | 9/2000 | Arwood | |
| 6,153,724 A | 11/2000 | Hollingsworth | |
| 6,224,579 B1 | 5/2001 | Modak et al. | |
| 6,413,446 B1 | 7/2002 | Mechtel et al. | |
| 6,451,437 B1 | 9/2002 | Amidaiji et al. | |
| 6,458,878 B1 | 10/2002 | Tsuboi et al. | |
| 6,482,912 B2 | 11/2002 | Boudjouk et al. | |
| 6,500,549 B1 | 12/2002 | Deppisch et al. | |
| 6,521,144 B2 | 2/2003 | Takezawa et al. | |
| 6,524,564 B1 | 2/2003 | Kim et al. | |
| 6,559,201 B2 | 5/2003 | Simendinger, III | |
| 6,565,924 B2 | 5/2003 | Babu et al. | |
| 6,716,895 B1 | 4/2004 | Terry | |
| 6,723,439 B2 | 4/2004 | Amidaiji et al. | |
| 6,861,493 B2 | 3/2005 | Bauer et al. | |
| 6,924,116 B2 | 8/2005 | Tan et al. | |
| 6,949,598 B2 | 9/2005 | Terry | |
| 7,098,256 B2 | 8/2006 | Ong et al. | |
| 7,141,183 B2 | 11/2006 | Hattori et al. | |
| 7,179,789 B2 | 2/2007 | Patt | |
| 7,204,940 B2 | 4/2007 | McDonald et al. | |
| 7,297,745 B2 | 11/2007 | Amidaiji et al. | |
| 7,345,131 B2 | 3/2008 | Selbertinger et al. | |
| 7,378,156 B2 | 5/2008 | Terry | |
| 7,449,537 B2 | 11/2008 | Boudjouk et al. | |
| 7,452,956 B2 | 11/2008 | Cheng et al. | |
| 7,544,722 B2 | 6/2009 | Boudjouk et al. | |
| 2002/0013385 A1 | 1/2002 | Simendinger, III | |
| 2002/0098214 A1 | 7/2002 | Adams et al. | |
| 2002/0156223 A1 | 10/2002 | Boudjouk et al. | |
| 2003/0022793 A1 | 1/2003 | Ring et al. | |
| 2003/0044451 A1 | 3/2003 | McGhee et al. | |
| 2003/0129421 A1 | 7/2003 | Terauchi et al. | |
| 2003/0207962 A1 | 11/2003 | Oya et al. | |
| 2003/0236552 A1 | 12/2003 | Roby | |
| 2004/0116551 A1 | 6/2004 | Terry | |
| 2005/0008613 A1 | 1/2005 | Peterson et al. | |

(Continued)

FOREIGN PATENT DOCUMENTS

CA 2 413 672 A1 8/2003

(Continued)

OTHER PUBLICATIONS

U.S. Appl. No. 60/934,093, filed Jun. 2007.*

(Continued)

*Primary Examiner* — Kuo-Liang Peng
(74) *Attorney, Agent, or Firm* — Foley & Lardner LLP

(57) ABSTRACT

Polyamine cross-linked polysiloxanes, such as functionalized polysiloxane cross-linked with a polyalkylenepolyamine are described herein. The polyamine cross-linked polysiloxanes may be used in an antifouling composition to prevent biological fouling in marine environments.

23 Claims, 5 Drawing Sheets

U.S. PATENT DOCUMENTS

| | | | |
|---|---|---|---|
| 2005/0009985 | A1 | 1/2005 | Selbertinger et al. |
| 2005/0080158 | A1 | 4/2005 | Ong et al. |
| 2005/0129962 | A1 | 6/2005 | Amidaiji et al. |
| 2005/0227092 | A1 | 10/2005 | Yamaya et al. |
| 2006/0014015 | A1 | 1/2006 | Travelute et al. |
| 2006/0276608 | A1 | 12/2006 | Lang et al. |
| 2007/0021529 | A1 | 1/2007 | Boudjouk et al. |
| 2007/0042199 | A1 | 2/2007 | Chisholm et al. |
| 2007/0048344 | A1 | 3/2007 | Yahiaoui et al. |
| 2007/0093618 | A1 | 4/2007 | Cheng et al. |
| 2007/0129474 | A1 | 6/2007 | Salamone et al. |
| 2007/0132949 | A1 | 6/2007 | Phelan |
| 2008/0001318 | A1 | 1/2008 | Schorzman et al. |
| 2008/0181862 | A1 | 7/2008 | Chisholm et al. |
| 2008/0199536 | A1 | 8/2008 | Terry |
| 2008/0213599 | A1 | 9/2008 | Webster et al. |
| 2009/0018276 | A1 | 1/2009 | Boudjouk et al. |
| 2009/0111937 | A1 | 4/2009 | Webster et al. |
| 2009/0143496 | A1 | 6/2009 | Ziche |
| 2009/0194733 | A1 | 8/2009 | Schulz et al. |
| 2009/0215762 | A1 | 8/2009 | Stafslien et al. |
| 2010/0004202 | A1 | 1/2010 | Chisholm et al. |

FOREIGN PATENT DOCUMENTS

| | | |
|---|---|---|
| CA | 2 621 000 | 3/2007 |
| EP | 1 496 079 A1 | 1/2005 |
| JP | 2-47371 | 2/1990 |
| WO | WO 2005/030405 A2 | 4/2005 |
| WO | WO 2006/086092 A2 | 8/2006 |
| WO | WO 2006/121937 A1 | 11/2006 |
| WO | WO 2007/053163 A2 | 5/2007 |
| WO | WO 2007/108980 A1 | 9/2007 |
| WO | WO 2008/008077 A2 | 1/2008 |
| WO | WO 2009/025924 A2 | 2/2009 |

OTHER PUBLICATIONS

U.S. Appl. No. 12/378,155, filed Feb. 2009.*
U.S. Appl. No. 12/278,049, filed Aug. 2008.*
U.S. Appl. No. 12/633,334, filed Dec. 2009.*
U.S. Appl. No. 11/810,696, filed Jun. 2007.*
Ekin et al., Library Synthesis and Characterization of 3-Aminopropyl-Terminated Poly(dimethylsiloxane)s and Poly(ε-caprolactone)-b-Poly(dimethylsiloxane)s, Journal of Polymer Science: Part A: Polymer Chemistry, 2006, vol. 44, No. 16, pp. 4880-4894.*
Tanaka et al., Physical Review Letters, 1992, vol. 68, No. 18, pp. 2794-2797 (Plus Figure, 5 pages total).*
Ekin et al. "Synthesis and characterization of novel hydroxyalkyl carbamate and dihydroxyalkyl carbamate terminated poly(dimethylsiloxane) oligomers and their block copolymer with poly(ε-caprolactone)" Macromolecules 39(25) (2006) 8659-8668.*
Tang et al. "Anti-inflammatory properties of triblock siloxane copolymer-blended materials" Biomaterials 20 (1999) 1365-1370.*
Abstract for Japanese Publication No. JP 04-370163, "Coating Composition," publication Date Dec. 22, 1992, 1 page.
Abstract for Japanese Publication No. JP 63-277222 A,"Curing Resin," publication Date Nov. 15, 1998, 1 page.
Abstract for Japanese Publication No. JP 11-222402, publication Date Aug. 17, 1999, Patentee or Applicant listed as Osaka Gas Co. Ltd., 1 page.
Abstract for Japanese Publication No. JP 2001-029451 (A), "Antibacterial Urethral Catheter and Manufacture of the same," Toyo Boseki et al., publication date Feb. 6, 2001, 1 page.
Abstract for JP 2000-264803, "Silver Microbide-Containing Photopolymerizable Monomer Compositions, and Solventless UV- or Electron Beam-Curable Resin Compositions Containing Them," Takeuchi et al., publication date Sep. 26, 2000, 1 page.
Abstract for JP 2003-327912, "Primer Antifouling Coating Material Composition for Ship, Composite Antifouling Coating Film for Ship, Method for Forming the Composite Antifouling Coating Film, Ship Coated with the Composite Antifouling Coating Film and Antifouling Method for Outer Hull of Ship," Masuda Hiroshi et al., publication date Nov. 19, 2003, 1 page.
Abstract for JP 51-17554, "UV-Curable Antimicrobial Acrylic Coating Materials," Honda et al., publication date May 14, 1993, 1 page.
Abstract for JP 53-139653, "Marine Antifouling Material," Takamizawa Minoru et al., publication date Dec. 6, 1978, 1 page.
Abstract for JP 60-09919, "Crosslinked Urethane Acrylate Polymer Particle-Containing Antimicrobial Coatings," Honda et al., publication date Jan. 18, 1994, 1 page.
Abstract for JP 63-270738, "Polyamine/Polysiloxane Block Copolymer", Tezuka Yasushi et al., publication date Nov. 8, 1988, 1 page.
Adhikari et al., "Mixed Macrodiol-Based Siloxane Polyurethanes: Effect of the Comacrodiol Structure on Properties and Morphology," Journal of Applied Polymer Science, 2000, vol. 78, pp. 1071-1082.
Bullock et al., "Surface Science of a Filled Polydimethylsiloxane-Based Alkoxysilane-Cured Elastomer: RTV11¹'" Journal of Colloid and Interface Science, 1999, vol. 210, pp. 18-36, Article ID jcis.1998.5856, available online at http://www.idealibrary.com.
Chen et al., "Macromolecules," 1995, vol. 28, pp. 1635-1642.
Chen et al., "Solvent Effects on the Surface Composition of Poly(dimethylsiloxane)-co-Polystyrene/Polystyrene Blends," Macromolecules, 1998, vol. 31, No. 26, pp. 9328-9336.
Ekin et al., "Combinatorial and High-Throughput Screening of the Effect of Siloxane Composition on the Surface Properties of Crosslinked Siloxane-Polyurethane Coatings," J. Comb. Chem., 2007, vol. 9, No. 1, pp. 178-188.
Ekin et al., "Library Synthesis and Characterization of 3-Aminopropyl-Terminated Poly(dimethylsiloxane)s and Poly(ε-caprolactone)-b-Poly(dimethylsiloxane)s," Journal of Polymer Science: Part A: Polymer Chemistry, 2006, vol. 44, No. 16, pp. 4880-4894.
Ekin et al., "Synthesis, formulation, and characterization of siloxane-polyurethane coatings for underwater marine applications using combinatorial high-throughput experimentation," J. Coat. Technol. Res., 2007, vol. 4, No. 4, pp. 435-451.
El-Hayek et al., Bacteriostatic polymer film immobilization. Journal of biomedical materials research. Part A, 2006, vol. 79 No. 4, pp. 874-881 (Plus Cover Sheet, 9 pages total).
Ha et al., Journal of Macromolecular Science, Polymer Reviews, 2005, vol. C45, 32 pgs.
Ho et al., "Polydimethylsiloxane-Urea-Urethane Copolymers with 1,4-Benzenedimethanol as Chain Extender," Macromolecules, 1993, vol. 26, No. 25, pp. 7029-7036.
Holohan et al., "Monofunctional polydimethylsiloxane oligomers for graft copolymerization," Macromol. Chem. Phys., 1994, vol. 195, No. 9, pp. 2965-2979 (Plus cover Sheet, 16 pages total).
Iojoiu et al., "Modified poly (ε-caprolactone)s and their use for drug-encapsulating nanoparticles," Journal of Polymer Science Part A: Polymer chemistry, 2004, vol. 42, No. 3, pp. 689-700.
Jiang et al., Preparation of crosslinked polystyrenes with quaternary ammonium and their antibacterial behavior Reactive & Functional Polymers 2005, vol. 62, 5 pages.
Johnston et al., "Networks from α,ω-Dihydroxpoly(dimethylsiloxane) and (Tridecafluoro-1,1,2,2-tetrahydrooctyl)triethoxysilane: Surface Microstructures and Surface Characterization," Macromolecules, 1999, vol. 32, No. 24, pp. 8173-8182.
Karal et al., "Blend of polycaprolactone-poly (dimethylsiloxane)-polycaprolactone triblock copolymer with poly(vinyl chloride) preparation and characterization," Polymer, 1997, vol. 38, No. 24, pp. 6071-6078.
Kawakami et al., "Silicone Macromers for Graft Polymer Synthesis," Polymer Journal, 1982, vol. 14, No. 11, pp. 913-917.
Lee et al., Journal of Applied Polymer Science, 2003, vol. 87, pp. 375-380.
Lenoir et al., Antimicrobial activity of polystyrene particles coated by photo-crosslinked block copolymers containing a biocidal polymethacrylate block. e-Polymers 2005, 11 pages.
Mahoney et al., Macromolecules, 2002, vol. 35, pp. 5256-5266.
Majumdar et al., "Preparation of Siloxane-Urethane Coating Having Spontaneously Formed Stable Biphasic Microtopographical Surfaces," Macromolecules, 2005, vol. 38, pp. 5875-5859.
Majumdar et al., "Thermoset Siloxane-Urethane Fouling Release Coatings," A.C.S. Symposium Series, 2007, vol. 957, pp. 61-75.
Patel et al., Macromolecules, 1988, vol. 21, pp. 2689-2696.

Pieper et al., "Combinatorial approach to study the effect of acrylic polyol composition on the properties of crosslinked siloxane-polyurethane fouling-release coatings," *J. Coat. Technol. Res.*, 2007, vol. 4, No. 4, pp. 453-461.

Pike et al., "Water-Induced Surface Rearrangements of Poly(dimethylsiloxane-urea-urethane) Segmented Block Copolymers," *Chem. Mater.*, 1996, vol. 8, No. 4, pp. 856-860.

Schweizer, Triclosan: a widely used biocide and its link to antibiotics. *FEMS Microbiology Letters*, 2001, vol. 202, No. 1, pp. 1-7 (Plus Cover Sheet, 9 pages total).

Smetankina et al., "Reactivity of organosilicon diisocyanates," XVII, Carcofunctional organosilicon compounds, Zhurnal Obshchei Khimii, 1974, vol. 44, No. 12, pp. 2638-2641.

Smith et al., *Macromolecules*, 1992, vol. 25, pp. 2575-2581.

Stafslien et al., "Combinatorial materials research applied to the development of new surface coatings IV. A high-throughput bacterial biofilm retention and retraction assay for screening fouling-release performance of coatings," *Biofouling*, 2007, vol. 23, No. 1, pp. 45-54.

Tanaka, et al., *Physical Review Letters*, 1992, vol. 68, No. 18, pp. 2794-2797 (Plus Figure, 5 pages total).

Tezuka et al., "Environmentally induced Macromolecular Rearrangement on the Surface of Polyurethane-Polysiloxane Block Copolymers," *J. Chem. Soc. Paraday Trans.*, 1991, vol. 87, pp. 147-152.

Tezuka et al., "Environmentally Induced Macromolecular Rearrangement on the Surface of Polyurethane-Polysiloxane Graft Copolymers," *Journal of Colloid and Interface Science*, May 1990, vol. 136, No. 2, pp. 408-414.

Thomas et al., "Silicones Containing Pendant Biocides for Antifouling Coatings," *Biofouling*, vol. 20, Nos. 4/5, Aug./Oct. 2004, pp. 227-236.

Wynne et al., *ACS Symposium Series*, 1994, vol. 572, pp. 64-80 (Plus Cover Sheet, 18 pages total).

Yilgor et al., "Novel triblock siloxane copolymer: Synthesis, characterization, and their use as surface modifying additives," Journal of Polymer Science Part A: Polymer chemistry, 1989, pp. 3673-3690.

Zhuang et al., "Determination of the Distribution of Poly(dimethylsiloxane) Segment Lengths at the Surface of Poly[(dimethylsiloxane)-urethane]-Segmented Copolymers by Time-of-Flight Secondary Ion Mass Spectrometry," *Macromolecules*, 1997, vol. 30, No. 4, pp. 1153-1157.

\* cited by examiner

ANTIFOULING MATERIALS CONTAINING CATIONIC POLYSILOXANES

CROSS-REFERENCE TO RELATED PATENT APPLICATIONS

This patent application claims priority to: U.S. Prov. Pat. App. Ser. No. 60/679,129, filed on May 9, 2005, entitled "Anti-Fouling Materials;" U.S. Prov. Pat. App. Ser. No. 60/743,044, filed on Dec. 15, 2005, entitled "Cationic Polysiloxanes;" U.S. Prov. Pat. App. Ser. No. 60/751,720, filed on Dec. 17, 2005, entitled "Cationic Polysiloxanes," and this patent application is a divisional application of U.S. patent application Ser. No. 11/429,923, filed on May 8, 2006, now U.S. Pat. No. 7,771,833 entitled "Anti-Fouling Materials Containing Cationic Polysiloxanes," the disclosures of which are expressly incorporated by reference herein in their entireties.

GOVERNMENT RIGHTS STATEMENT

This invention was made with government support under Grant Nos. N00014-02-1-0794, N00014-03-1-0702, and N00014-04-1-0597 awarded by the Department of Defense, Office of Naval Research. The government has certain rights in the invention.

BACKGROUND

Fouling of surfaces exposed to an aquatic environment is a serious problem. For example, surfaces of ships such as the hull, offshore marine structures such as oil rigs, sea water conduit systems for seaside plants, buoys, heat-exchangers, cooling towers, de-salination equipment, filtration membranes, docks, and the like may all experience some degree of fouling when continually exposed to water. In the case of ships, fouling can inhibit vessel performance and capabilities. For example, fouling may substantially increase fuel consumption and may necessitate extensive and more frequent maintenance, all of which raise the overall costs of operation. Fouling may also reduce ship speed, maneuverability, and range, which impede performance. On another level, attachment of regionally specific aquatic organisms on ships that traverse the world can lead to the unwanted invasion and infestation of these organisms to non-indigenous harbors. In some instances, this can have severe adverse effects on local aquatic ecosystems.

Over the years there have been numerous attempts to minimize the effect of fouling on structures exposed to an aquatic environment. For example, coatings (e.g., paints, etc.) have been developed that impede the attachment and/or growth of aquatic organisms on such structures. Traditionally, two parallel lines of coatings research have predominated: biocide containing coatings and low surface energy, "non-stick," fouling release coatings.

The most common approach to control marine fouling on the hulls of ships involves dispersing copper oxide particles in a degradable polymer matrix to produce an antifouling coating. The copper oxide serves as a biocide that deters settlement of marine organisms. Since the copper oxide is not chemically bound to the polymer matrix, it is gradually removed from the coating surface. The slow degradation of the polymer matrix in an aqueous environment allows for replenishment of the coating surface with copper oxide to maintain biocidal activity. After about three years of service, the degree of degradation of the coating is severe enough that the ship must be dry docked and a fresh layer of coating applied. While this approach is effective, it is undesirable due to release of copper oxide into the marine environment and the need for frequent dry docking.

The second approach, which is currently being used to a much lesser degree, involves the application of a nontoxic, non degradable coating that allows for easy release of marine organisms that have settled on the coating. These coatings, commonly referred to as foul-release coatings, are typically silicone elastomers that possess a low surface energy such that the adhesion strength is relatively low and organisms can be readily removed by water jetting or moving the ship at high speed through the water. The primary disadvantage of this approach is that frequent cleaning of ship hulls is required and the coatings are easily damaged due to their low modulus.

Accordingly, it would be desirable to provide an improved antifouling coating (i.e., a coating having biocidal properties and/or foul-release properties) that is more environmentally sensitive and/or is more effective at inhibiting fouling.

SUMMARY

The present application relates to polymeric materials which have antifouling and/or antimicrobial activity and include polymers that exhibit biocidal and/or fouling release activity. The polymeric material is typically a cross-linked polymeric material, such as a cross-linked polysiloxane material, which includes quaternary amine functional groups.

The antifouling material may prepared by cross linking polymers and/or copolymers to provide a network of covalently bonded polymers that include quaternary amino functional groups. In one embodiment, the polymer network may include at least one polysiloxane segment. In another embodiment, the polymer network may include polysiloxane polymers cross linked together using ionene bridges. The polymer network may also include a number of fouling inhibiting moieties or other functional groups, such as biocidal moieties, fouling release moieties, and/or texturizing moieties.

Formulas I, II, and III show exemplary embodiments of the various polymers that may be used to prepare the polymer network. In general terms, Formulas I, II, and II may be used to make an antifouling material which includes two polymer or copolymer segments cross linked using an ionene bridge. The use of an ionene bridge may be desirable from a number of perspectives. For example, the reaction that is used to form the quaternary amines in the inonene bridge may be reversible under shear stress (e.g., ship moving through water, pressure washer, etc.). Because the quaternization reaction is reversible, a coating that uses this antifouling material may slowly release the outer layer of the coating and thus prevent fouling on the surface of the coating. Furthermore, quaternary and tertiary amines are toxic to organisms that cause fouling. Thus, biocidal qualities of the ionene bridge and tertiary amines formed in the dequaternization reaction can also reduce fouling. In one embodiment, halide functionalized polymers and/or copolymers may be cross linked using polyamine compounds. However, it should be appreciated that in other embodiments, dihalide compounds may be reacted with amine functionalized polymers and/or copolymers to provide ionene bridged polymeric materials.

Formulas I and III show various polymers and/or copolymers that may have a variety of backbones. For example, in one embodiment, at least one of the polymer backbones includes a polysiloxane polymer segment. For example, the polymer backbone may include a polysiloxane segment such as polydialkylsiloxanes, polyalkylhydrosiloxane, etc. and a carbon polymer segment such as a polyacrylate segment. In another example, the polymer backbones may be entirely made of a polysiloxane polymer (e.g., polydimethylsiloxane (PDMS)-co-polymethylhydrosiloxane(PMHS)). The antifouling material may include multiple polymers that can be cross linked using an ionene. The use of polysiloxane in the polymer backbone may be desirable to provide a rubbery characteristic to the antifouling material.

As shown in Formulas I, II, and III the polysiloxane/polyacrylate (i.e., polysiloxane and/or polyacrylate based polymers and/or copolymers) backbones, ionene bridges, and/or graft polymers may include a variety of additional moieties. For example, suitable moieties may include: a biocidal moiety (e.g., Triclosan, quatenary ammonium, pyridinium, polymers and copolymers such as polymethacrylate that include these groups, etc.), a texturizing or fouling release moiety (e.g., hydrophilic groups such as polyether groups, hydrophobic groups such as perfluoroalkyl groups, liquid crystalline groups such as deuterobenzene groups, self-organizing groups, cleavable groups such as alkoxy alkyl groups such as alkoxy alkyls, and polymers and copolymers such as polymethacrylate including these groups, etc.), or a cross linking moiety (e.g., epoxy, olefin, amine, acid, aldehyde, ester, etc.). In one embodiment, these moieties may be coupled directly to the polysiloxane/polyacrylate backbone or the ionene bridge. However, in other embodiments, these moieties may be coupled to polymers and/or copolymers such as polymethacrylate which are part of or grafted on to the polymer backbones and/or the ionene bridge.

Formula IV shows an example of an antifouling material that may be prepared using the materials shown in Formulas I, II, and III. It should be appreciated that the materials shown in FIGS. I, II, and III may be modified in a number of ways to provide a variety of different antifouling materials. For example, it may be desirable to limit the crosslinking that occurs outside of the quaternization reaction. Thus, the number of cross linking moieties provided on the polymers and/or copolymers shown in Formulas I, II, and III may be reduced or eliminated all together. Also, it may be desirable to limit the amount and number of biocidal and/or textural moieties in a similar fashion. In one embodiment, the ionene linked polysiloxane/polyacrylate material may having a nitrogen content (wt %) of between about 0.2% to 3%, desirably, between about 0.4% to 2%, or suitably, between about 0.6% and 1%.

In one embodiment, the polysiloxane/polyacrylate used to make the cross linked material may have a molecular weight of about 4000 to 25000.

The polyamine may be any of a number of suitable compounds. For example, one suitable diamine may have Formula VIII:

$$R=R_2N\text{-}A\text{-}NR_2 \qquad \text{Formula VIII}$$

wherein is "A" is a spacer or linking group consisting of siloxane, alkyl, ether, ester, polyether, phenyl, aryl, heterocyclic, polyaromatic, polypeptide, polysiloxane, polyamide, polysulfone, or polyurethane group. Generally, as used herein "linking group" refers to a group that is used to link two other atoms together and has less than 12 atoms. "R" may be any suitable alkyl, cyclopentyl, cyclohexyl, benzyl, toluoyl, xylyl, or phenyl. Of course, it should be appreciated that triamines and other higher order amines may be used as well.

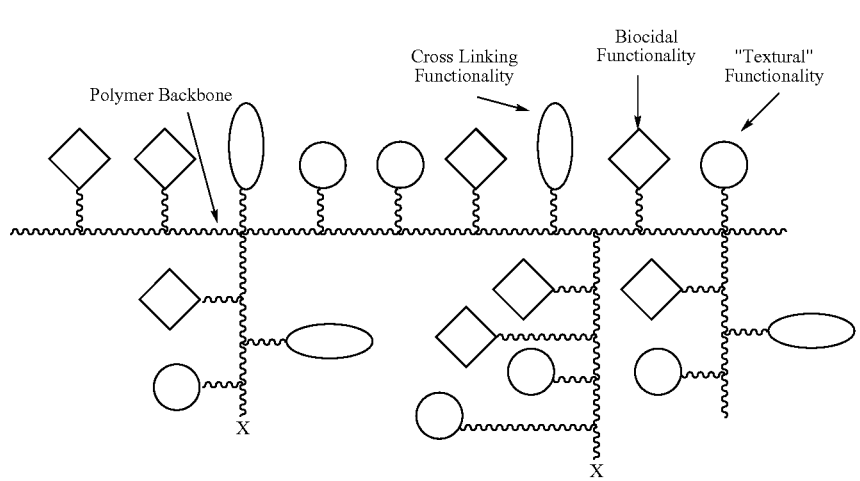

Formula I

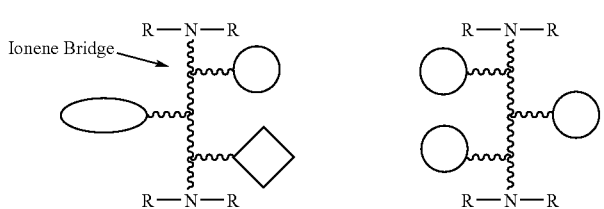

Formulas II

-continued
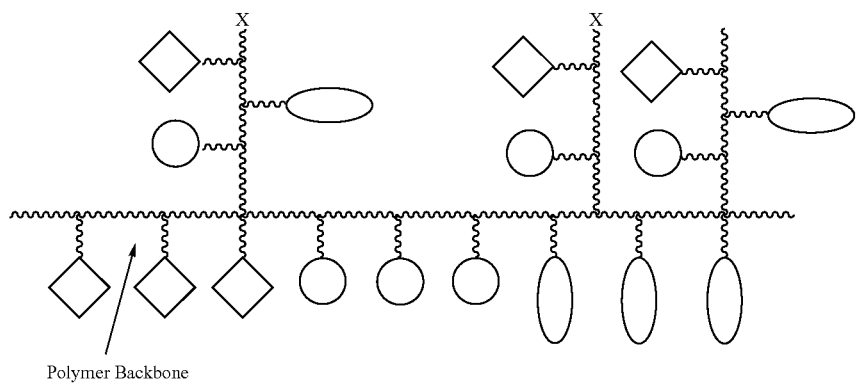
Formula III
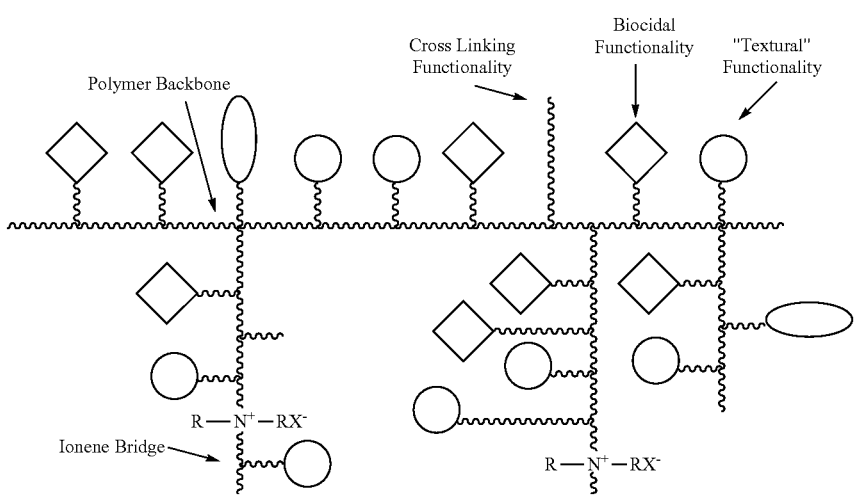
Formula IV
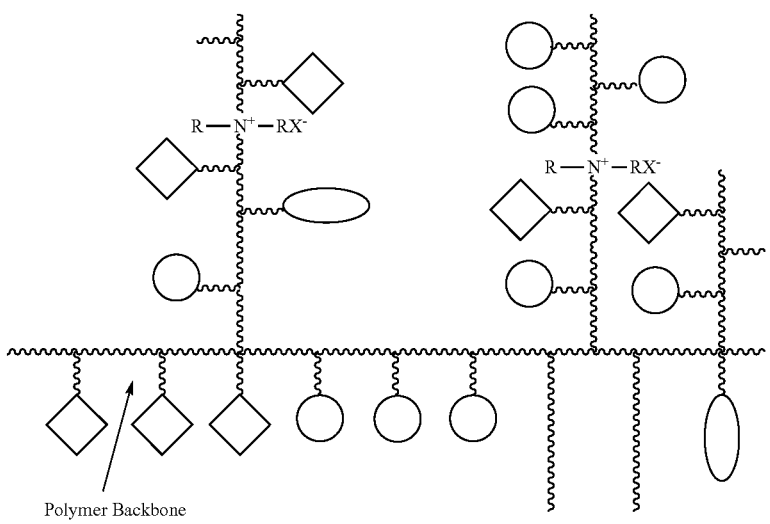

In another embodiment, an antifouling material comprises a cross linked copolymer which is prepared by cross linking a copolymer (random or block) using a polyamine or polyhalide functionalized material where the copolymer has the formula:

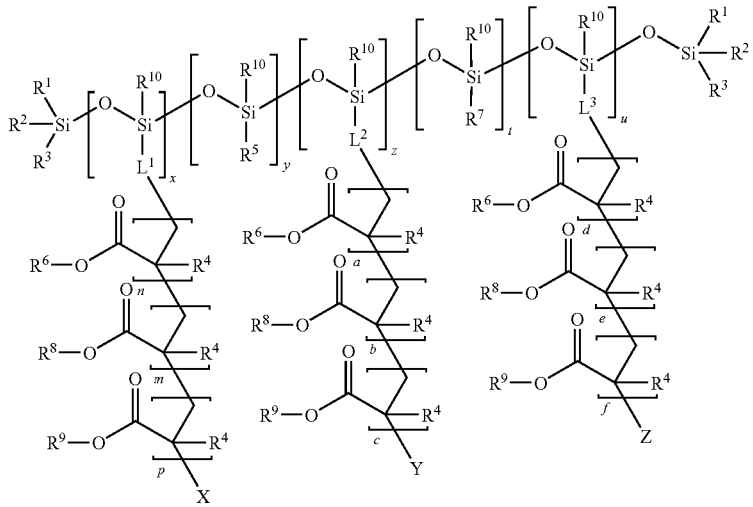

wherein x is an integer from 0 to 100, 1 to 50, or 2 to 10;
y is an integer from 0 to 100, 1 to 25, or 2 to 10;
z is an integer from 0 to 100, 1 to 50, or 2 to 10;
t is an integer from 0 to 100, 1 to 25, or 2 to 10;
u is an integer from 0 to 100, 1 to 50, or 2 to 10;
x+y+z+t+u is at least 5, 10, 50, 100 or between 25-250, or 50-200;
n is an integer from 0 to 50, 5 to 40, or 10 to 30;
m is an integer from 0 to 50, 5 to 40, or 10 to 30;
p is an integer from 0 to 50, 5 to 40, or 10 to 30;
a is an integer from 0 to 50, 5 to 40, or 10 to 30;
b is an integer from 0 to 50, 5 to 40, or 10 to 30;
c is an integer from 0 to 50, 5 to 40, or 10 to 30;
d is an integer from 0 to 50, 5 to 40, or 10 to 30;
e is an integer from 0 to 50, 5 to 40, or 10 to 30;
f is an integer from 0 to 50, 5 to 40, or 10 to 30;
X is a halide, an amino group (if X is a halide, the material that is used to cross link the copolymer is a polyamine or if X is an amino group, the material that is used to cross link the copolymer is a polyhalide), or an end cap group;
Y is a halide, an amino group (if Y is a halide, the material that is used to cross link the copolymer is a polyamine or if Y is an amino group, the material that is used to cross link the copolymer is a polyhalide), or an end cap group;
Z is a halide, an amino group (if Z is a halide, the material that is used to cross link the copolymer is a polyamine or if Z is an amino group, the material that is used to cross link the copolymer is a polyhalide), or an end cap group;
$L^1$, $L^2$, and $L^3$ are linking groups;

$R^1$, $R^2$, $R^3$, and $R^{10}$ are independently $C_1$-$C_{10}$ alkyl, cyclopentyl, cyclohexyl, benzyl, toluoyl, xylyl or phenyl;
$R^4$ is hydrogen, $C_1$-$C_{10}$ alkyl, cyclopentyl, cyclohexyl, benzyl, toluoyl, xylyl, or phenyl;
$R^5$ is $C_1$-$C_{10}$ alkyl, cyclopentyl, cyclohexyl, benzyl, toluoyl, xylyl, phenyl, or a cross linking group;
$R^7$ is hydrogen, $C_1$-$C_{10}$ alkyl, cyclopentyl, cyclohexyl, benzyl, toluoyl, xylyl, phenyl, or a cross linking group;
$R^6$, $R^8$, and $R^9$ include independently a biocidal group that is toxic to organisms that cause fouling in an aquatic environment; a fouling release group; a texturizing group; or combination thereof.

Typically, at least one of n, m, p, a, b, c, d, e, or f is not 0. For example, the present polymeric materials suitably include those in which n+m+p is not less than 5 (e.g., 10 to 30); a+b+c is not less than 5 (e.g., 10 to 30); and/or d+e+f is not less than 5 (e.g., 10 to 30).

In this embodiment, the polysiloxane backbone may be a random or block copolymer. Also, the polymethacrylate based polymer grafted to the polysiloxane backbone may be a random or block copolymer. Accordingly, the formulas shown herein should be understood to refer to either a block or random copolymer having the specified monomer units in any order.

In another embodiment, an antifouling material comprises a cross linked copolymer which is prepared by cross linking a copolymer (random or block) using a polyamine or polyhalide functionalized material where the copolymer has the formula:

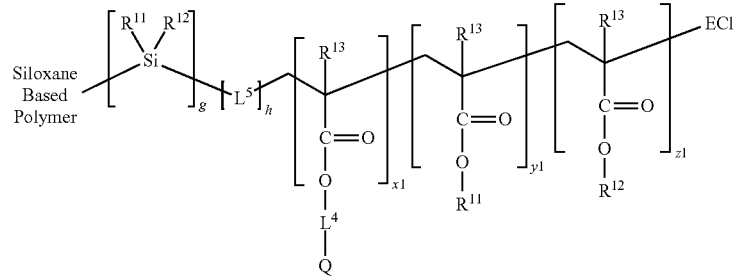

wherein the siloxane based polymer can be the siloxane polymer from the previous embodiment with one of the ends removed (e.g., the siloxane polymer from the previous embodiment may have the leftmost terminal silicon group removed and it would then be coupled at that point to the silicon group shown in this embodiment)

x1 is an integer from 0 to 100, 1 to 50, or 2 to 10;

y1 is an integer from 0 to 100, 1 to 50, or 2 to 10;

z1 is an integer from 0 to 100, 1 to 50, or 2 to 10;

g is 0 or 1;

h is 0 or 1;

at least one of x1, y1, or z1 is not 0;

Q is a halide, an amino group (if Q is a halide, the material that is used to cross link the copolymer is a polyamine or if Q is an amino group, the material that is used to cross link the copolymer is a polyhalide), or an end cap group;

$L^4$ and $L^5$ are linking groups;

$R^{11}$ and $R^{12}$ are independently $C_1$-$C_{10}$ alkyl, cyclopentyl, cyclohexyl, benzyl, toluoyl, xylyl or phenyl;

$R^5$ is $C_1$-$C_{10}$ alkyl, cyclopentyl, cyclohexyl, benzyl, toluoyl, xylyl, phenyl, or a cross linking group;

$R^{13}$ is an H and/or $C_1$-$C_{10}$ alkyl, typically Me;

$R^{11}$ and $R^{12}$ include independently a biocidal group that is toxic to organisms that cause fouling in an aquatic environment; a fouling release group; a texturizing group; or combination thereof.

A number of compounds suitable for use as or in antifouling materials are disclosed herein. In general, antifouling materials refer to products, agents, or compositions which may provide biocidal and/or fouling release properties when used alone or in combination with other materials or substances. The antifouling materials described herein may include one or more of a number of suitable copolymers (e.g., block copolymers, graft copolymers, random copolymers, etc.) which provide biocidal and/or fouling release characteristics.

In one embodiment, a copolymer may be prepared by cross linking two copolymers using an ionene bridge. The ionene bridge may be formed by reacting a polyamine such as a diamine with a halide on the copolymer. The copolymer may include various polysiloxanes (e.g., polymethylhydrosiloxane, polydimethylsiloxane, etc.) alone or combined with other carbon based polymers such as polyacrylate based polymers (e.g., polymethacrylate). The copolymer may be prepared as a random or block copolymer. In addition, other polymers or functional groups may be attached to the copolymer backbone (e.g., polyacrylate based copolymers may be grafted to the copolymer backbone). A variety of fouling inhibiting moieties may be attached directly to the copolymer backbone, to a polymer grafted to the copolymer backbone, or to the ionene bridge used to cross link the copolymers. Fouling inhibiting moieties may include biocidal groups, fouling release groups (groups capable of being cleaved off the copolymer), and/or texturizing groups (groups which provide a rubbery consistency or reduce the tendency of fouling organisms to adhere to the antifouling material).

The ionene cross linked copolymers may be prepared using the Menschutkin reaction between a dihalide and a ditertiary amine. In one embodiment, a halide such as chlorine or bromine may be attached to the copolymer (either directly to the backbone or a pendant group or graft polymer) which reacts with a polyamine to form the ionene bridge between the copolymers. The ionene bridge includes quaternary amines which couple adjoining copolymers together. The reaction to form the quaternary amines may be reversible under shear stress so that the cross linked copolymer has fouling release characteristics (e.g., ship moving through water, use of a high pressure sprayer, etc.) The cross linked copolymer may also be prepared using amine functionalized copolymers and a halide functionalized cross linking group.

It should be appreciated that a number of suitable ways may be used to provide the described antifouling material. For example, any of a number of suitable polyamines may be used to cross link the copolymers to form the ionene bridges between the copolymers. In one embodiment, diamines are used to cross link the copolymer.

The antifouling material may be applied as a coating to a surface where it is desired to prevent fouling (e.g., the surface of a ship's hull, etc.). In one embodiment, the halide functionalized copolymers and the polyamines may be combined shortly before or at the same time that the coating is applied to the surface to be protected.

A polymeric material is described herein that includes functionalized polysiloxane and/or salts thereof. The functionalized polysiloxane may include one or more polyamine subunits. It should be appreciated that the polyamine functionalized polysiloxane may comprise any suitable amount or type of polyamine subunits depending on the desired properties of the final material. In one embodiment, the functionalized polysiloxane includes polyalkylenepolyamine subunits such as polyethylenepolyamine or polypropylenepolyamine subunits. The polymeric material may comprise about 5 to 35 wt % polyamine subunits, in some instances about 8 to 25 wt % polyamine subunits and, in others, about 10 to 15 wt % polyamine subunits. Also, the polyamine subunits may have a molecular weight of at least about 500 g/mol. In another embodiment, the functionalized polysiloxane may include one, two, three, or more different types of polyamine subunits (e.g., multiple polyalkylenepolyamine subunits). Furthermore, salts of the functionalized polysiloxane may include one or more quaternary ammonium groups and/or one or more protonated ammonium groups.

The functionalized polysiloxane may have biocidal and/or foul-release properties. For example, the amine groups in the polyamine subunits may act as a biocide. In particular, quaternary ammonium groups and/or protonated ammonium groups may especially function as a biocide. The amine groups are covalently bonded in the polymeric material, which serves to prevent undue degradation of the amine groups into the environment. The functionalized polysiloxane may also include additional covalently bonded biocidal groups such as Triclosan. Typically, the biocidal groups are toxic to organisms that cause fouling in an aquatic environment. In one embodiment, a second biocidal group (e.g., Triclosan) may be introduced to the functionalized polysiloxane by reacting an epoxy functionalized biocidal group with an amine group on a polyamine subunit. In another embodiment, a second biocidal group may be introduced to the polysiloxane by reacting the functionalized polysiloxane with epihalohydrin (e.g., epichlorohydrin) and Triclosan.

The polymeric material may be included in an antifouling composition. The antifouling composition may be used to coat a surface that is susceptible to fouling such as a ship's hull. The biocidal and/or foul-release properties of the polymeric material may prevent fouling of the ship's hull or other substrate. Typically, the antifouling composition is coated on a substrate as a reaction mixture that then subsequently cures. It should be appreciated that some curing may take place before the antifouling composition is coated on the substrate so that the viscosity of the mixture is such that the coating application remains on the substrate. The polymeric material may also be used in any of a number of other applications such as medical devices, and so forth.

The functionalized polysiloxane may be prepared by reacting a mixture which includes alkoxysilyl functionalized polyamine and silanol terminated polysiloxane. In one embodiment, the alkoxysilyl functionalized polyamine may include one or more dialkoxyalkylsilylalkyl groups and/or trialkoxysilylalkyl groups. For example, the alkoxysilyl functionalized polyamine may include one or more dimethoxymethylsilylpropyl groups and/or trimethoxysilylpropyl groups. In another embodiment, the alkoxysilyl functionalized polyamine includes alkoxysilyl functionalized polyalkylene-polyamine such as trimethoxysilylpropyl functionalized polyethyleneimine and/or dimethoxymethylsilylpropyl functionalized polyethyleneimine. The silanol terminated polysiloxane may be any suitable silanol terminated polysiloxane. In one embodiment, the silanol terminated polysiloxane has an average molecular weight of about 10,000 g/mol to 100,000 g/mol or about 15,000 g/mol to 75,000 g/mol. A crosslinking agent such as alkoxysilane and/or other materials such as fumed silica may also be added to the mixture which is used to make the functionalized polysiloxane.

DRAWINGS

DESCRIPTION

Figure 1:
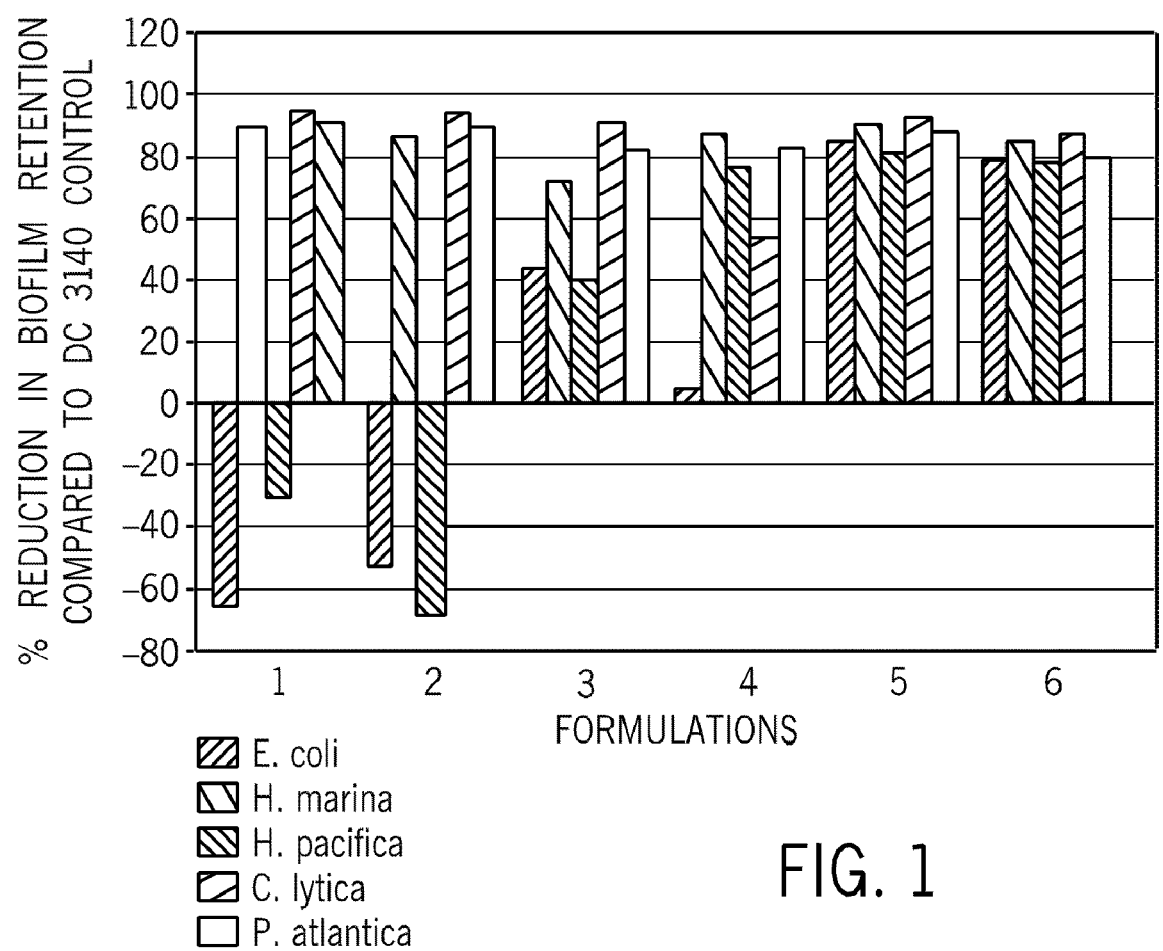
FIG. 1 is a chart that shows the % reduction in biofilm retention of various antifouling compositions compared to DC 3140 control.

Generally, the antifouling materials described herein comprise polymers that exhibit biocidal and/or fouling release activity. The various embodiments and descriptions of antifouling materials may be used independently (e.g., as a single coating layer) or in combination with other materials (e.g., paint pigment, etc.) to prevent structures and other surfaces exposed to an aquatic environment (e.g., marine environments, freshwater environments, etc.) from fouling. In many situations, the composition of the coating material includes other compounds such as curing agents, cross link initiators, and the like.

Suitable polyamines that may be used to cross link halide functionalized polymeric materials, such as the polymers and/or copolymers shown in Formulas I and III, include 1,4-diaminobutane; bis(dimethylamino)-dimethylsilane; 1,3-dipyridyl propane; 1,3-bis(N,N-dimethylamino)-butane; 1,n-bis(N,N-dialkylamino)-alkane where N,N-dialkyl groups are ethyl and/or methyl and 1,n-substituted alkane backbone typically has from 2 to 10 carbon atoms, bis(aminoalkyl)-benzene such as 1,4-bis(N,N-dimethylaminomethyl)-benzene or 1,3-di-(aminoethyl)-benzene; 1,n-bis(N,N-dialkylamino)-cycloalkane such as 1,4-bis(N,N-dimethylamino)-cyclohexane or 1,4-bis(N,N-dimethylaminomethyl)-cyclohexane; 1,n-dipyridyl alkane such as 1,3-dipyridyl butane or 1,6-dipyridyl hexane; 1,n-dipyridyl cycloalkane such as 1,4-dipyridyl cyclohexane; polyalkylenepolyamine such as N,N,N',N'',N''-pentamethyldiethylenetriamine, tetraethylenetriamine, or N,N,N',N'-tetramethylpropylenediamine; N,N,N',N'-tetramethyl-1,4-butanediamine; N,N,N'N'-tetramethyl-ethylenediamine; N,N,N'N'-tetramethyl-1,6-hexanediamine; N,N,N'N'-tetramethylbenzidine; N,N,N',N'-tetraethylethylenediamine; 2,2'-dipyridyl; and 4,4'-dipyridyl.

In another embodiment, the polyamine used to cross link the copolymers may include one or more secondary or primary amines which react with a halide on the copolymers. After the polyamine has been coupled to the copolymer, the amino groups may be quaternized, e.g., by reaction with an alkylating agent, to form an ionene bridge between the two copolymers.

The fouling release moiety may be any of a number of suitable fouling-release moieties. For example, suitable fouling release moieties may include groups having Formula V:

    Formula V wherein is "A" is a spacer consisting of alkyl, ether, ester, polyether, phenyl, aryl, heterocyclic, polyaromatic, polypeptide, polysiloxane, polyamide, polysulfone, or polyurethane group. "J" is a terminal functionality which affects the physical properties of the polysiloxane to enhance the fouling release action as described herein such as perfluoroalkyl. Suitable examples of "J" groups include:

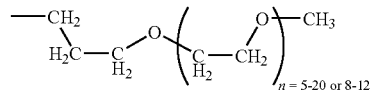

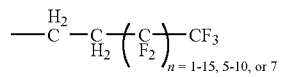

The materials shown in Formulas I, II, and III may include a pendant biocidal moiety. Suitable examples of such biocidal moieties include groups having Formula VI:

    Formula VI wherein is "A" is a spacer consisting of alkyl, ether, ester, polyether, phenyl, aryl, heterocyclic, polyaromatic, polypeptide, polysiloxane, polyamide, polysulfone, or polyurethane group. "G" is a terminal functionality which is a biocide for aquatic organisms such as in one embodiment, tetracyclines, triclosans, and floxacins, or, in another embodiment, ammonium salts and pyridinium salts. The spacer "A" may be selected so that it hydrolyzes and the biocide group "G" is therefore cleavable from the copolymer. In some instances the group "G" may only exhibit biocidal activity after cleavage from the polymer backbone. Also, the spacer "A" may be chosen so that it does not undergo hydrolysis and thus the biocide group "G" is not cleavable from the polymer backbone. In one embodiment, the polymer backbone may include polysiloxane and/or polymethacrylate that include both cleavable and non-cleavable biocide groups. In another embodiment, one type of polysiloxane may include cleavable biocide groups and be cross linked to other polysiloxanes, at least one of which includes non-cleavable biocide groups. Suitable examples of biocide groups include triclosan and pyridinium groups, as shown below, respectively:

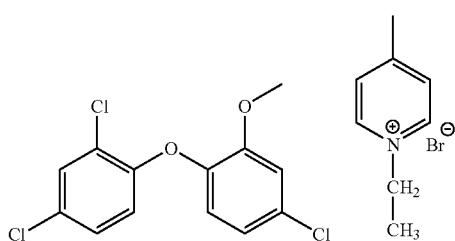

The materials shown in Formulas I, II, and III may include a pendant cross linking moiety. Suitable examples of such cross linking moieties include groups having Formula VII:

R=-A-E  Formula VII wherein is "A" is a spacer consisting of alkyl, ether, ester, polyether, phenyl, aryl, heterocyclic, polyaromatic, polypeptide, polysiloxane, polyamide, polysulfone, or polyurethane group. "E" is a terminal functionality consisting of an epoxy, hydroxy, amino, carboxylic, ester, capable of undergoing further reaction when brought into contact with a curing agent. The copolymer may be cross linked using any of a number of cross linking agents such as those having two vinyl groups (e.g., divinyl PDMS, divinyl benzene, etc.).

The antifouling material may be provided as a coating (with or without the inclusion of other ingredients such as dyes, etc.) that is applied to a surface that is subject to fouling by marine organisms. The coating may be prepared by combining the copolymers shown in Formulas I and III with the polyamine shown in Formula II. After these materials have been combined, the coating is applied to the surface and allowed to set up.

The present compositions may be used as an antifouling coatings having biocidal activity and/or fouling release activity. These coatings are more or less effective at inhibiting settlement/growth/proliferation of biological entities on the coated surface. The functionalized polysiloxane compositions can be used in conjunction with other materials to comprise formulations for use in the antifouling coatings. It is anticipated that the formulation can be used to serve as antifouling coatings in a number of applications. In particular, as mentioned previously, the present compositions may be useful for the coating of ship hulls, heat-exchangers, cooling towers, de-salination equipment, filtration membranes, docks, off-shore oil rigs, and other submerged superstructures as well as any structure or surface subject to fouling in an aquatic environment.

Polymeric materials are described herein that include functionalized polysiloxane and/or salts thereof. The polymeric materials may be useful in a wide variety of settings. For example, the polymeric materials may be used to prevent fouling in marine or aquatic environments or any other place where exposure to water may result in fouling. The polymeric material may be included in a coating that is applied to the surfaces of ships such as the hull, offshore marine structures such as oil rigs, sea water conduit systems for seaside plants, buoys, heat-exchangers, cooling towers, de-salination equipment, filtration membranes, docks, and the like. The polymeric material may also be included in other coatings such as those used to coat medical devices that are surgically implanted in a human or animal (e.g., cardiac pacemaker, cardiac defibrillator, and the like). It should be appreciated that the polymeric material may be used in any suitable application.

The polymeric material may include one or more polyamine subunits (e.g., polyamine functionalized polysiloxane). It should be appreciated that the polyamine functionalized polysiloxane may comprise any suitable amount or type of polyamine subunits depending on the desired properties of the final material. In one embodiment, the polyamine functionalized polysiloxane may include polyalkylenepolyamine subunits. The polyalkylenepolyamine subunits may include polyalkylene groups having 2 to 6 carbon atoms. For example, the polyalkylenepolyamine subunits may include polyethylenepolyamine subunits, polypropylenepolyamine subunits, and so forth. The polyamine subunits may include at least 5 amine groups, at least 10 amine groups, or, suitably at least 15 amine groups. The polyamine subunits may be linked to the polysiloxane using any suitable linking group such as alkyl groups having 1 to 6 carbon atoms. In one embodiment, salts of the functionalized polysiloxane may include quaternary amine groups and/or protonated amine groups. It should also be appreciated that the polyamine subunits may be block or random polymer subunits. Preferably, the polyamine subunits are random polymer subunits.

The polymeric material may include any suitable amount of polyamine subunits. For example, the polymeric material may comprise about 5 to 35 wt % polyamine subunits, about 8 to 25 wt % polyamine subunits, or, suitably, about 10 to 15 wt % polyamine subunits. The polyamine subunits may also have any suitable molecular weight. For example, the polyamine subunits may have an average molecular weight of at least about 500 g/mol, at least about 1000 g/mol, or, suitably, at least about 2000 g/mol. In another embodiment, the polyamine subunits may have an average molecular weight of about 2000 to 4000 g/mol. In yet another embodiment, the polyamine subunits in the polymeric material may have an average molecular weight of no more than about 7500 g/mol or no more than about 5000 g/mol. It should be appreciated that the polymeric material may include one, two, three, or more different types of polyamine subunits (e.g., multiple polyalkylenepolyamine subunits such as polyethylenepolyamine and polypropylenepolyamine).

The polymeric material may be prepared by reacting a mixture which includes alkoxysilyl functionalized polyamine and silanol terminated polysiloxane via a condensation reaction which produces an alcohol byproduct (e.g., methanol, ethanol, etc. depending on the alkoxysilyl group). Any suitable alkoxysilyl functionalized polyamine may be used. For example, in certain embodiments, the alkoxysilyl functionalized polyamine may include one or more dialkoxyalkylsilylalkyl groups such as dimethoxymethylsilylethyl groups, diethoxyethylsilylethyl groups, dimethoxymethylsilylpropyl groups, diethoxyethylsilylpropyl groups, dimethoxymethylsilylbutyl groups, diethoxyethylsilylbutyl groups, and the like and/or trialkoxysilylalkyl groups such as trimethoxysilylpropyl groups, triethoxysilylpropyl groups, trimethoxysilylbutyl groups, triethoxysilylbutyl groups, trimethoxysilylethyl groups, triethoxysilylethyl groups, and the like. In another embodiment, the alkoxysilyl functionalized polyamine may include one or more dimethoxymethylsilylalkyl groups, diethoxyethylsilylalkyl groups, trimethoxysilylalkyl groups, and/or triethoxysilylalkyl groups.

The alkoxysilyl functionalized polyamine may include an alkoxysilyl functionalized polyalkylenepolyamine such as dialkoxyalkylsilylalkyl functionalized polyethylenepolyamine and/or trialkoxysilylalkyl functionalized polyethylenepolyamine. Suitable alkoxysilyl functionalized polyalkylenepolyamines include trimethoxysilylalkyl (e.g., trimethoxysilylpropyl, trimethoxysilylethyl, trimethoxysilylbutyl, and the like) functionalized polyethyleneimine, triethoxysilylalkyl (e.g., triethoxysilylpropyl, triethoxysilylethyl, triethoxysilylbutyl, and the like) functionalized polyethyleneimine, dimethoxymethylsilylalkyl (e.g., dimethoxymethylsilylpropyl, dimethoxymethylsilylethyl, dimethoxymethylsilylbutyl, and the like) functionalized polyethyleneimine, and/or diethoxyethylsilylalkyl (e.g., diethoxyethylsilylpropyl, diethoxyethylsilylethyl, diethoxyethylsilylbutyl, and the like) functionalized polyethyleneimine.

In one embodiment, the alkoxysilyl functionalized polyamine may include a compound having the formula (as a block or random polymer)

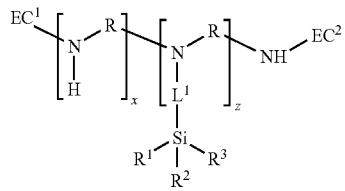

wherein x is at least about 10, at least about 20, an integer from 0 to 125, about 40 to 100, and/or no more than about 200; z is at least 1, at least 5, an integer from 0 to 25, about 10 to 20, and/or no more than about 50; x+z is at least 2, at least 5, about 10 to 200, about 25 to 100, and/or no more than about 500; $EC^1$ and $EC^2$ are end cap groups, which may include an alkoxysilyl functional group; $EC^1$ and $EC^2$ may also be H, trialkoxysilylalkyl, or dialkoxyalkylsilylalkyl; $L^1$ is a linking group, which may be linear or branched alkylene having 2 to 6 carbon atoms (e.g., ethylene, propylene, and the like); R may be a linear or branched alkylene having 2 to 6 carbon atoms (e.g., ethylene, propylene, and the like); $R^1$ is alkoxy; and $R^2$ and $R^3$ may be independently alkoxy or alkyl such as linear or branched alkoxy or alkyl having 1 to 6 carbon atoms. It should be appreciated, however, that x and/or z may be any suitable number. Also, in one embodiment, z may be 0 and at least one of $EC^1$ and $EC^2$ may be trialkoxysilylalkyl (e.g., trimethoxysilylpropyl) or dialkoxyalkylsilylalkyl (e.g., dimethoxymethylsilylpropyl). In this embodiment, x may be 1 or 2.

In another embodiment, the alkoxysilyl functionalized polyamine may include a compound having the formula (as a block or random polymer)

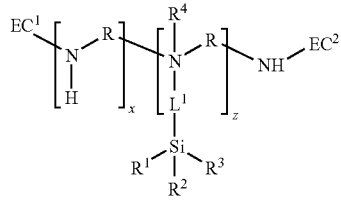

wherein x is an integer from 0 to 125, at least about 10, at least about 20, about 40 to 100, and/or no more than about 200; z is at least 1, at least 5, an integer from 0 to 25, about 10 to 20, and/or no more than about 50; x+z is at least 2, at least 5, about 10 to 200, about 25 to 100, and/or no more than about 500; $EC^1$ and $EC^2$ are end cap groups, which may include an alkoxysilyl functional group; $EC^1$ and $EC^2$ may also be H, trialkoxysilylalkyl, or dialkoxyalkylsilylalkyl; $L^1$ is a linking group, which may be linear or branched alkylene having 2 to 6 carbon atoms (e.g., ethylene, propylene, and the like); R may be a linear or branched alkylene having 2 to 6 carbon atoms (e.g., ethylene, propylene, and the like); $R^1$ is alkoxy; and $R^2$ and $R^3$ may be independently alkoxy or alkyl such as linear or branched alkoxy or alkyl having 1 to 6 carbon atoms. It should be appreciated, however, that x and/or z may be any suitable number; and $R^4$ is hydrogen, alkyl, cyclopentyl, cyclohexyl, benzyl, toluoyl, xylyl, or phenyl. Also, in one embodiment, z may be 0 and at least one of $EC^1$ and $EC^2$ may be trialkoxysilylalkyl (e.g., trimethoxysilylpropyl) or dialkoxyalkylsilylalkyl (e.g., dimethoxymethylsilylpropyl). In this embodiment, x may be 1 or 2.

The alkoxysilyl functionalized polyamine may have an average molecular weight of at least about 500 g/mol or, suitably, at least about 1000 g/mol. In another embodiment, the alkoxysilyl functionalized polyamine may have an average molecular weight of about 2000 to 4000 g/mol or no more than about 5000 g/mol. It should be appreciated that the alkoxysilyl functionalized polyamine may have any suitable molecular weight.

The silanol terminated polysiloxane may be any suitable silanol terminated polysiloxane. In one embodiment, the silanol terminated polysiloxane has an average molecular weight of at least about 5,000 g/mol. In another embodiment, the silanol terminated polysiloxane has an average molecular weight of about 10,000 g/mol to 100,000 g/mol or, suitably, about 15,000 g/mol to 75,000 g/mol. In yet another embodiment, the silanol terminated polysiloxane may have an average molecular weight of no more than about 150,000 g/mol. It should be appreciated, however, that the silanol terminated polysiloxane may have any suitable molecular weight and is not limited to any particular molecular weight or range of molecular weights described herein.

It should be appreciated that the silanol terminated polysiloxane may be generated in the mixture by hydrolyzing alkoxy or acetoxy terminated polysiloxane. Thus, the mixture may include relatively small amounts of the silanol terminated polysiloxane because the silanol terminated polysiloxane may react relatively quickly after being formed. In one embodiment, a suitable alkoxysilyl terminated polysiloxane which may be used to generate the silanol terminated polysiloxane includes a compound having the following formula (as either a random or block copolymer)

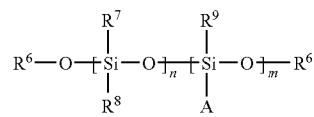

wherein $R^6$, $R^7$, $R^8$, and $R^9$ are alkyl such as linear or branched alkyl having 1 to 6 carbon atoms;

A is an amino containing pendant group; n is an integer from 0 to about 200, at least about 10, at least about 20, about 40 to 100, and/or no more than about 200; m is an integer from 0 to about 50, at least 5, about 10 to 25, and/or no more than about 50; n+m is at least about 10, about 15 to 45, and/or no more than about 200. It should be appreciated that n and m may be any suitable number and should not be limited to the numbers or range of numbers described herein.

In one embodiment, the amino containing pendant group "A" in the formula above may include a compound having the following formula

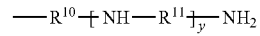

wherein $R^{10}$ and $R^{11}$ are independently alkylene such as linear or branched alkylene having 2 to 6 carbon atoms (e.g., ethylene and/or propylene); and y is a positive integer. In a further embodiment, y may be about 5 to 50 or 1. It should be appreciated that y may be any suitable integer.

The silanol terminated polysiloxane (either added as a silanol terminated polysiloxane or generated in the mixture) may have the following formula (as either a random or block copolymer)

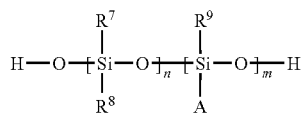

wherein $R^7$, $R^8$, and $R^9$ are independently alkyl; A is a an amino containing pendant group; n is an integer from 0 to about 6000, at least about 50, about 100 to 1500, about 200 to 1000, and/or no more than about 5000; m is an integer from 0 to about 2000, at least 30, about 60 to 600, about 90 to 450, and/or no more than about 1500; and n+m is at least about 10, at least 100, about 150 to 750, and/or no more than about 7500. It should be appreciated that n and m may be any suitable number and should not be limited to the numbers or range of numbers described herein. In one embodiment, n is at least 1, m is at least 1, and the silanol terminated polysiloxane is a random polymer. The amino containing group "A" shown in the formula may be the same as that shown in the previous paragraph.

The mixture may include widely ranging amounts of alkoxysilyl functionalized polysiloxane. For example, the mixture may include about 5 to 35 wt % alkoxysilyl functionalized polysiloxane, about 8 to 25 wt % alkoxysilyl functionalized polysiloxane, or, suitably, 10 to 15 wt % alkoxysilyl functionalized polysiloxane. The mixture may also include a crosslinking agent and/or other materials such as fumed silica. The crosslinking agent may include one or more alkoxysilanes, such as alkyltrialkoxysilane and/or dialkyldialkoxysilane.

The polymeric material typically has biocidal (e.g., toxic to organisms that cause fouling in an aquatic environment) and/or foul-release properties, which renders it useful as an antifouling material. These properties may stem from the quaternary ammonium groups and/or protonated ammonium groups that are present. However, unlike some earlier materials, the groups that provide the biocidal and/or foul-release properties are covalently bonded in the polymeric material, which serves to prevent undue degradation of the polymeric material, which may result in environmental damage.

The functionalized polysiloxane may also include additional covalently bonded biocidal groups such as Triclosan. In one embodiment, a second biocidal group (e.g., Triclosan) may be introduced to the functionalized polysiloxane by reacting an epoxy functionalized biocidal group with an amine group. In another embodiment, a second biocidal group may be introduced to the polysiloxane by reacting the polysiloxane with epihalohydrin (e.g., epichlorohydrin) and Triclosan.

In one embodiment, the polymeric material may be included in an antifouling composition as already mentioned above. The antifouling composition may be used to coat a surface that is susceptible to fouling such as a ship's hull. The biocidal and/or foul-release properties of the polymeric material may prevent fouling of the ship's hull or other substrate.

The antifouling composition and/or the polymeric material may be used by coating a substrate with a reaction mixture that subsequently cures (e.g., moisture curing). It should be appreciated that some curing may take place before the antifouling composition is coated on the substrate so that the viscosity of the mixture is such that the coating application remains on the substrate.

Additional Illustrative Embodiments

The following exemplary embodiments are presented to illustrate the present polymers, compositions and methods and to assist one of ordinary skill in making and using the same. The examples are not intended in any way to otherwise limit the scope of the invention.

In one embodiment, the polymeric material includes a cross linked copolymer which is prepared by cross linking a random or block copolymer using a polyamine. The random or block copolymer may have the formula:

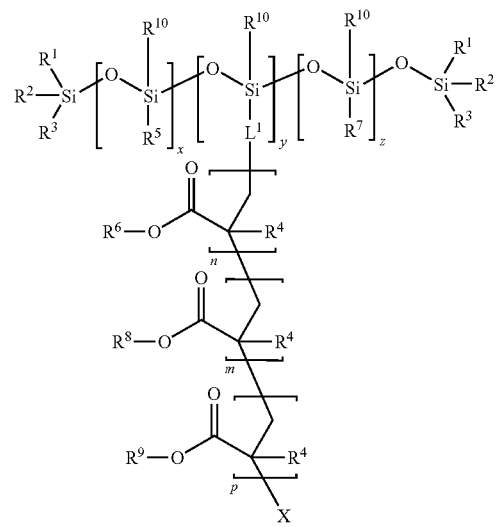

wherein x is an integer from 0 to 100;
y is an integer from 1 to 100;
z is an integer from 0 to 100;
x+y+z is at least 5
n is an integer from 0 to 50;
m is an integer from 0 to 50;
p is an integer from 0 to 50;
X is a halide;
$L^1$ is a linking group;
$R^1$, $R^2$, $R^3$ and $R^{10}$ independently $C_1$-$C_{10}$ alkyl, cyclopentyl, cyclohexyl, benzyl, toluoyl, xylyl or phenyl;
$R^4$ is hydrogen, $C_1$-$C_{10}$ alkyl, cyclopentyl, cyclohexyl, benzyl, toluoyl, xylyl, phenyl;
$R^5$ is $C_1$-$C_{10}$ alkyl, cyclopentyl, cyclohexyl, benzyl, toluoyl, xylyl, phenyl, or a cross linking group;
$R^7$ is hydrogen, $C_1$-$C_{10}$ alkyl, cyclopentyl, cyclohexyl, benzyl, toluoyl, xylyl, phenyl, or a cross linking group;
$R^6$, $R^8$, and $R^9$ independently a biocidal group that is toxic to organisms that cause fouling in an aquatic environment; a fouling release group; a texturizing group; or combination thereof. At least one of n, m, or p is not 0. The biocidal group may include a triclosan moiety.

In such a cross linked copolymer $R^4$ and $R^{10}$ are typically methyl. The polysiloxane copolymer is commonly a random copolymer and the graft polymethacrylate (co)polymer chain which is grafted onto the polysiloxane copolymer is typically a block (co)polymer. At least one of $R^6$, $R^8$, and $R^9$ typically includes an alkoxy alkyl group, such as a methoxy ethyl group or a polyalkoxy alkyl group. One or more of $R^6$, $R^8$, and $R^9$ may includes a biocidal group. At least one of $R^6$, $R^8$, and $R^9$ may be:

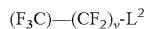

wherein v is an integer from 1 to 25; and $L^2$ is a linking group. The $L^2$ linker may be an ethylene group, a methylene group or a combination thereof. X is commonly Cl, Br or a combination thereof. The polyamine may include a diamine, e.g., 1,4-diaminobutane, bis(dimethylamino)-dimethylsilane, 1,3-dipyridyl propane, 1,3-bis(N,N-dimethylamino)-butane, or combinations thereof. Other polyamines, such as N,N,N'N", N"-pentamethyl-diethylenetriamine, may also be employed.

In another embodiment, the polymeric material includes a cross linked copolymer which is prepared by cross linking a random or block copolymer using a polyamine, where the random or block copolymer has the formula:

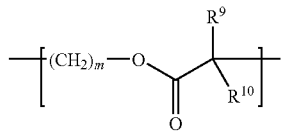

wherein $R^9$ and $R^{10}$ are independently hydrogen or lower alkyl and m is 2 to 6. In this type of polymeric material, the $R^7$ group may be represented by:

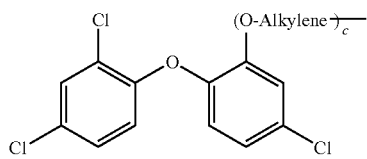

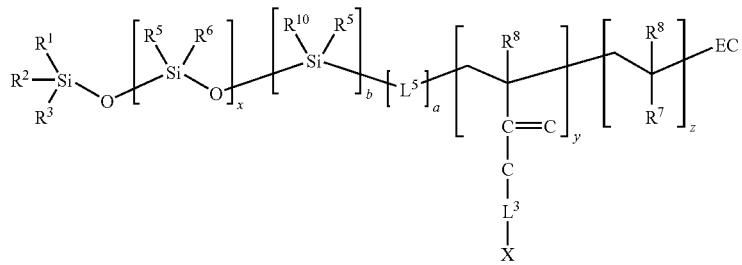

wherein x is an integer from 0 to 100;
y is an integer from 1 to 100;
z is an integer from 0 to 100;
x+y+z is at least 5
a is 0 or 1;
b is 0 or 1;
X is a halide;
EC is an end cap group;
$L^5$ and $L^3$ are linking groups;
$R^1$, $R^2$, $R^3$, $R^5$, and $R^{10}$ are independently $C_1$-$C_{10}$ alkyl, cyclopentyl, cyclohexyl, benzyl, toluoyl, xylyl or phenyl;
$R^6$ is $C_1$-$C_{10}$ alkyl, cyclopentyl, cyclohexyl, benzyl, toluoyl, xylyl, phenyl, or a cross linking group; and
$R^7$ is a $C_1$-$C_{10}$ alkyl, cyclopentyl, cyclohexyl, benzyl, toluoyl, xylyl, phenyl, a group that includes a biocidal moiety that is toxic to organisms that cause fouling in an aquatic environment, a fouling release group, a texturizing group, or a combination thereof.
$R^5$ is typically methyl and $R^7$ may include a biocidal group, such as a triclosan moiety. The $L^3$ linker is commonly an alkylene group, wherein the alkylene group suitably has 2-10 carbon atoms. $L^3$-X may be a haloalkyl group, such as a 2-chloroethyl or 3-bromopropyl group. The $L^1$ linker is commonly a group such as represented by the structure:

wherein c is 0 or 1 and the alkylene has 2 to 20 carbon atoms. The polyamine employed as a cross-linker may be a diamine, such as 1,4-diaminobutane, bis(dimethylamino)-dimethylsilane, 1,3-dipyridyl propane and/or 1,3-bis(N,N-dimethylamino)-butane. The polyamine may also include other amines, such as N,N,N',N",N"-pentamethyl-diethylenetriamine.

In another embodiment, an antifouling material comprising a first polymer cross linked with a second polymer using an ionene bridge is provided. The first polymer and/or the second polymer comprise a polysiloxane polymer segment. At least one of the first and second polymers may include a pendant group selected from the group comprising a texturizing group, a fouling release group, a biocidal group, or a mixture thereof. The pendant group may include a fluorocarbon is coupled to the first polymer, the second polymer, and/or the ionene bridge.

In yet another embodiment, the polyamine cross-linked polysiloxane may include cross-linked copolymer which is prepared by cross-linking a copolymer using a polymine, wherein the copolymer has the formula:

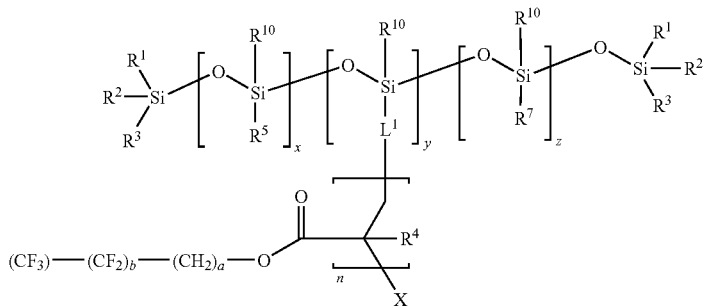

wherein x is an integer from 0 to 100;
y is an integer from 1 to 100;
z is an integer from 0 to 100;
x+y+z is at least 10;
n is an integer from 1 to 50;
a is 1, 2, or 3;
b is an integer from 1 to 15;
X is Cl and/or Br;
$L^1$ is a linking group;
$R^1$, $R^2$, $R^3$, and $R^{10}$ are independently $C_1$-$C_{10}$ alkyl, cyclopentyl, cyclohexyl, benzyl, toluoyl, xylyl or phenyl;
$R^4$ is hydrogen, $C_1$-$C_{10}$ alkyl, cyclopentyl, cyclohexyl, benzyl, toluoyl, xylyl, phenyl;
$R^5$ is $C_1$-$C_{10}$ alkyl, cyclopentyl, cyclohexyl, benzyl, toluoyl, xylyl, phenyl, or a cross linking group; and
$R^7$ is hydrogen, $C_1$-$C_{10}$ alkyl, cyclopentyl, cyclohexyl, benzyl, toluoyl, xylyl, phenyl, or a cross linking group.

EXAMPLES

The following examples are presented to illustrate the present invention and to assist one of ordinary skill in making and using the same. The examples are not intended in any way to otherwise limit the scope of the invention. All percentages are by weight unless otherwise noted. The materials shown in Table 1 were used in examples 1-5 and were supplied by the suppliers shown.

TABLE 1

| Material | Supplier |
| --- | --- |
| DMS-S35 - Silanol terminated PDMS, 49,000 g/mol | Gelest Inc., Morrisville, PA |
| DMS-S27 - Silanol terminated PDMS, 18,000 g/mol | Gelest Inc., Morrisville, PA |
| SIS6962.0 - Hexamethyldisilazane (treated Fumed Silica) | Gelest Inc., Morrisville, PA |
| SIM6555.0 - Methyltriethoxysilane | Gelest Inc., Morrisville, PA |
| 4-methyl-2-pentanone | Aldrich |
| SSP-060 - Trimethoxysilylpropyl modified polyethylenimine | Gelest Inc., Morrisville, PA |
| DC 3140 - Flowable Mil spec RTV silicone coating | Dow Corning |

A 50 mM Tetrabutylammonium fluoride catalyst solution (hereinafter referred to as "Catalyst A") was prepared by mixing 1.25 mL of 1.0 M Tetrabutylammonium fluoride to a 25 mL volumetric flask and brought to volume with 4-methyl-2-pentanone.

Example 1

Samples 1-10 of polymeric antifouling compositions having the formulations shown in Table 2 were prepared according to the following procedure. The amounts of the materials shown in Table 2 were thoroughly mixed by vortexing and deposited into modified 24 well polystyrene plates. The Samples were cured at 50° C. overnight.

TABLE 2

| Sample | SSP-060 (50 wt % in Isopropanol) | DMS-S35 (50 wt % in 4-methyl-2-pentanone) | DMS-S27 (50 wt % in 4-methyl-2-pentanone) | Fumed Silica | Methyl-triethoxysilane | Catalyst A |
| --- | --- | --- | --- | --- | --- | --- |
| Control | — | 9 g | — | — | 1 g | 1 g |
| 1 | 2 g | — | 8 g | — | — | 1.113 g |
| 2 | 2.1 g | 4.1 g | 4 g | — | — | 1.108 g |
| 3 | 2.1 g | 8.1 g | — | — | — | 1.105 g |
| 4 | 1 g | — | 8.3 g | — | — | 0.994 g |
| 5 | 1 g | 4 g | 4.2 g | — | — | 0.996 g |
| 6 | 1 g | 8 g | — | — | — | 0.999 g |
| 7 | 0.176 g | 8.824 g | — | — | 1 g | 1 g |
| 8 | 0.509 g | 8.491 g | — | — | 1 g | 1 g |
| 9 | 1 g | 8 g | — | — | 1 g | 1 g |
| 10 | 4 g | 32 g | — | 2 g | 4 g | 4 g |

Example 2

The antifouling performance of Samples 1-6 from Table 2 was evaluated by assessing the ability of the antifouling compositions to inhibit or minimize bacterial biofilm formation. The formulations cast into the 24 well plates were inoculated with stationary phase cultures of bacteria (~24 hr) resuspended in a minimal nutrient growth medium at ~$10^7$ cells/mL. The plates were then placed in a 28° C. incubator for 18 hours (*C. lytica*, *P. atlantica*) or 48 hours (*H. pacifica*, *H. marina*, *E. coli*) to facilitate bacterial attachment and subsequent colonization. The plates were then rinsed three times with 1.0 mL of deionized water to remove any planktonic or loosely attached cells. The amount of adhered biofilm remaining on the coating surfaces was then stained with the biomass indicator dye crystal violet. Once dry, the crystal violet dye is extracted from the biofilm with addition of 0.5 mL of 33 wt % glacial acetic acid and the resulting eluate is measured for absorbance at 600 nm. The measured absorbance values obtained are directly proportional to the amount of biofilm adhered to the coating surface.

The results of trials carried out with four marine bacteria (i.e., *H. marina*, *H. pacifica*, *C. lytica*, and *P. atlantica*) and one medically relevant bacterium (*E. coli*) are summarized in FIG. 1. FIG. 1 is a chart that shows the % reduction in biofilm retention compared to DC 3140 control on the Y-axis and the sample number on the X-axis. As shown in FIG. 1, samples 5 and 6 demonstrated very good antifouling performance against all bacteria tested.

Example 3

The mechanical characteristics of Samples 1-6 from Table 2 were determined using differential scanning calorimetry (DSC) and dynamic mechanical thermal analysis (DMTA). DSC was performed on a TA Instruments Q1000-0235 with the following parameters: heat-cool-heat (5° C./min, −90° C. to 100° C.). DMTA was performed on a TA Instrument Q800-0295 with single cantilever clamp (5° C./min, −150° C. to 20° C.). Table 3 shows the melting temperatures obtained using DSC and DMTA and the glass transition temperature obtained using DMTA.

TABLE 3

| Sample | $T_m$ (° C.) (using DSC) | $T_g$ (° C.) (using DMTA) | $T_m$ (° C.) (using DMTA) |
|---|---|---|---|
| 1 | −46.5 | −113 | −48.4 |
| 2 | −44.6 | −106 | −46.7 |
| 3 | −43.1 | −112 | −44.0 |
| 4 | −48.2 | −109 | −52.1 |
| 5 | −45.9 | — | — |
| 6 | −43.9 | — | — |

Example 4

The antifouling performance of the control and Samples 7-9 from Table 2 was evaluated using the method described in Example 2. However, in this example, only a single bacterium was used—*C. lytica*. Also, the plates were incubated at 28° C. for 18 hours. Table 4 shows the percent biofilm reduction compared to DC 3140 control.

TABLE 4

| Sample | % Biofilm Reduction Compared to DC 3140 |
|---|---|
| Control | 2 |
| 7 | 12 |
| 8 | 3 |
| 9 | 66 |

Figure 2:
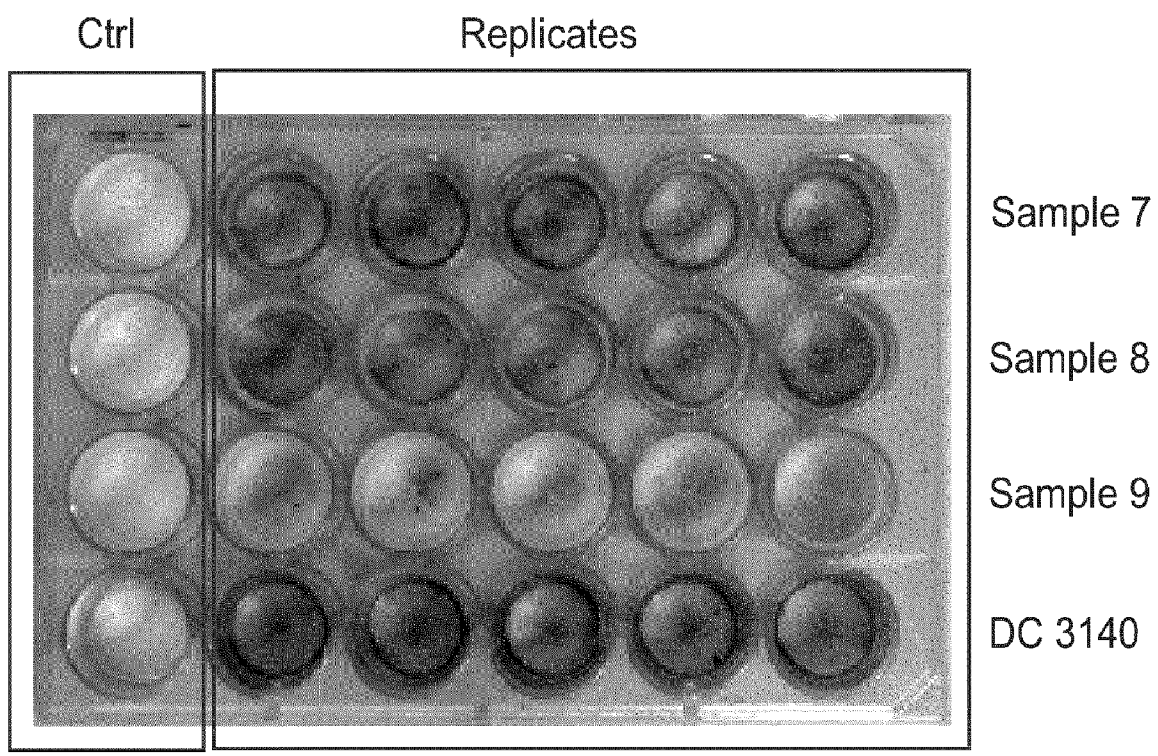
FIG. 2 is a scanning electron microscope image of the surface of the polymeric material from Sample 1 in Table 2.

FIG. 2 shows a digital image of the crystal stained samples. From FIG. 2 and Table 4, it is clearly demonstrated that Sample 9 significantly reduces biofilm growth and retention when compared to the DC 3140 control and the other Samples. It should be noted that the far left hand column in FIG. 2 are assay controls for each of the samples (inoculated with nutrient medium only).

Example 5

In this example, the mechanical characteristics of Samples 8-10 from Table 2 were determined. For Modulus, Engineering Strength, and Toughnes, an Instron 5542 with a 500 N load cell was used. ASTM method D412 was followed and samples were prepared using die B. Table 5 shows the mechanical properties of Samples 8-10.

TABLE 5

| Sample | Modulus @ 25° C. 2% strain (MPA) | Modulus @ 25° C. 5% strain (MPA) | Engineering Strength (MPA) | Toughness (MPA) |
|---|---|---|---|---|
| 8 | 1.113 | 1.1 | 60.13 | 28.29 |
| 9 | 0.901 | 0.877 | 48.97 | 26.74 |
| 10 | 1.403 | 1.337 | 29.7 | 5.77 |

Example 6

Illustration of General Synthetic Strategy for Graft Copolymers

Synthesis of PMHS-co-PDMS-g-polymethacrylate(PMA) ester

PMHS-co-PDMS-g-polymethacrylate may be synthesized as shown in Scheme 1 below. Initially, PMHS-co-PDMS (e.g., such as is commercially available from Gelest, Inc. 11 East Steel Road, Morrisville, Pa. 19067 as product # HMS-501 (50-55 wt. % Methylhydrosiloxane-dimethylsiloxane copolymer, trimethylsiloxane terminated, 10-15 cs, 900-1200 molecular weight) or HMS-082 (7-8 wt. % Methylhydrosiloxane-dimethylsiloxane copolymer, trimethylsiloxane terminated, 110-150 cs, 5000-7000 molecular weight)) and allyl isobutyryl bromide are added to dry toluene in a flask under nitrogen purge. Karstedt's catalyst is added to this mixture and the temperature is raised to 90° C. Reaction is allowed to continue for 8 to 10 hours at this temperature. The reaction mixture is then cooled and the bulk of the solvent is evaporated.

Scheme 1

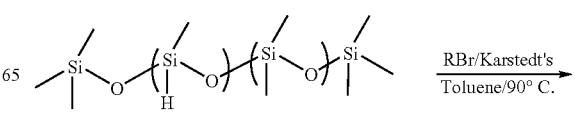

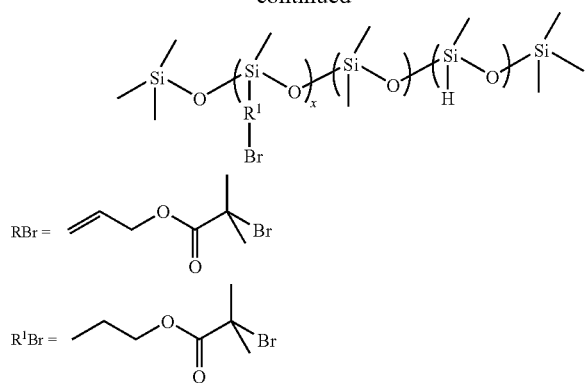

To form the graft copolymer, the isobutyryl functionalized polysiloxane may be added to a Schlenk tube under nitrogen purge followed by dry THF. The appropriate (meth)acrylate ester required to generate the desired graft poly(meth)acrylate copolymer side chain(s) is added. A catalyst, such as copper (I) bromide, and a corresponding ligand, such as N,N,N',N',N"-pentamethyl-diethylenetriamine, are added to the mixture and it is subjected to multiple (e.g., three or more) freeze-thaw pump cycles. After the freeze-thaw pump cycles, the temperature of the reaction mixture is raised to about 60-90° C. and the polymerization reaction is allowed to continue for about 8 to 72 hours. After polymerization is completed, the polymer may be recovered by precipitation into methanol and filtration. The polymer may be dissolved in toluene and passed through a neutral alumina column to remove the catalyst, followed by precipitation into methanol, filtration and drying.

Example 7

Polymethylhydrosiloxane(PMHS)-co-polydimethylsiloxane(PDMS)-g-polytriclosanmethacrylate(PTMA) is synthesized as shown in Scheme 2 below. Initially, 20 g of PMHS-co-PDMS, which is available from Gelest, Inc. 11 East Steel Road, Morrisville, Pa. 19067 as product # HMS-082 (7-8 wt. % Methylhydrosiloxane-dimethylsiloxane copolymer, trimethylsiloxane terminated, 110-150 cs) and 4 g of allyl isobutyryl bromide are added to dry toluene in a flask under nitrogen purge and Karstedt's catalyst is added to this mixture. The temperature is raised to 90° C. and the reaction continued for 8 h. After the reaction, the solvent is evaporated and the isobutyryl functionalized polysiloxane is added to a schlenk tube under nitrogen purge followed by dry THF. The catalyst, copper bromide, the ligand, N,N,N',N',N"-pentamethyl-diethylenetriamine and 19.8 g methacrylate functionalized triclosan are added to the flask and subjected to three freeze-thaw pump cycles. After the freeze-thaw pump cycles, the temperature is raised to 90° C. and the polymerization continued for 48 h. After polymerization, the polymer is recovered by precipitating it into methanol and then filtering it. The polymer is dissolved in toluene and passed through a neutral alumina column to remove the catalyst, precipitated into methanol, filtered and dried.

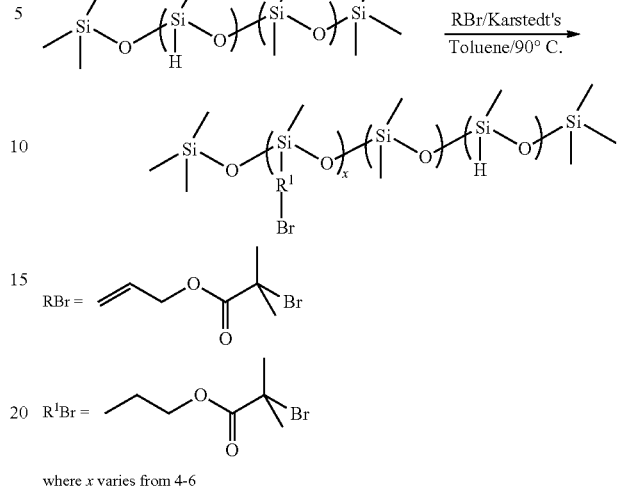

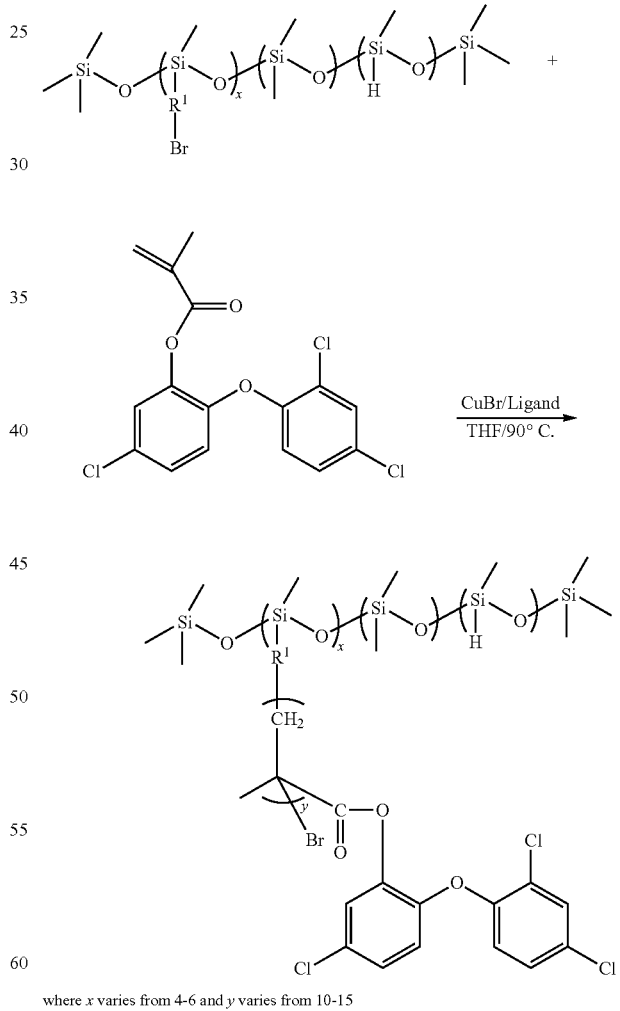

The PMHS-co-PDMS-g-PTMA is used to prepare an ionene coating in the manner shown in Scheme 3. 1 g of the above polymer and 0.03 g of bis(dimethylamino)-dimethylsilane

Scheme 3

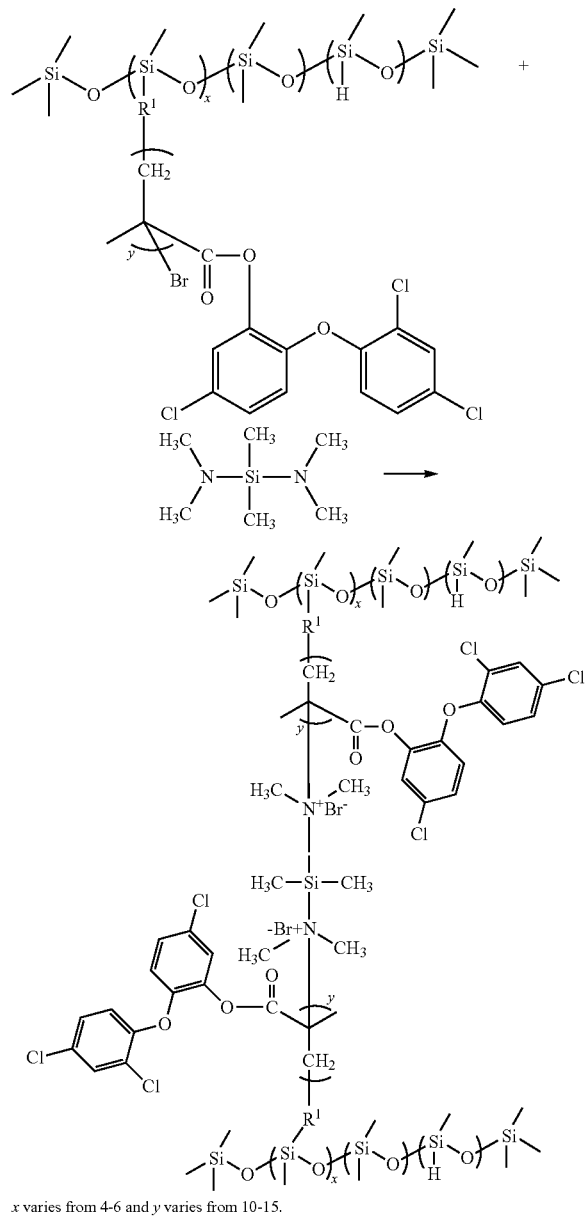

x varies from 4-6 and y varies from 10-15.

is dissolved in toluene and deposited into microtitre plate wells. The ionene polymer is cured at ambient temperature for 8 h and further cured at 50° C. for 12 h. The structure of the polymer network in the coating is given below.

Example 8

PDMS-co-PMHS-g-polyheptadecafluoro decyl methacrylate(PHDFMA) is synthesized as follows. Initially, 20 g of PMHS-co-PDMS, which is available from Gelest, Inc. as product # HMS-082 (7-8 wt. % Methylhydrosiloxane-dimethylsiloxane copolymer, trimethylsiloxane terminated, 110-150 cs) and 4 g of allyl isobutyryl bromide are added to dry toluene in a flask under nitrogen purge and Karstedt's catalyst is added to this mixture. The temperature is raised to 90° C. and the reaction continued for 8 h. After the reaction, the solvent is evaporated. 20 g of the isobutyryl functionalized polysiloxane is dissolved in 150 ml of dry THF in a schlenk flask under nitrogen purge. 7.4 ml of heptadecafluoro decyl methacrylate is added to the flask followed by 0.32 g copper (I) bromide and 0.46 ml of ligand, N,N,N',N',N''-pentamethyl-diethylenetriamine. The mixture is subjected to three freeze-thaw pump cycles and then allowed to polymerize at 90° C. for 8 h. The polymer is recovered by precipitating it into methanol and then filtering it. The polymer is dissolved in toluene and passed through a neutral alumina column to remove the catalyst, precipitated into methanol, filtered and dried. The number average molecular weight is 14000.

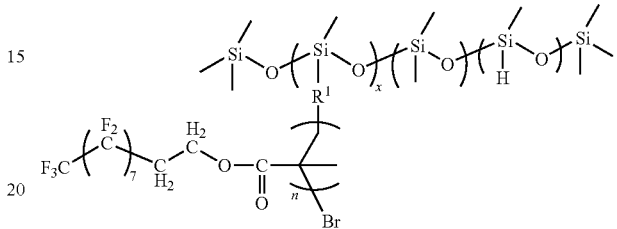

where n varies from 10 to 20 and x varies from 4 to 6

The PMHS-co-PDMS-g-PHDFMA is used to prepare an ionene coating. 1 g of PMHS-co-PDMS-g-PHDFMA and 0.03 g of Bis(dimethylamino)-dimethylsilane is dissolved in toluene and deposited into microtitre plate wells. The ionene polymer is cured at ambient temperature for 8 h and further cured at 50° C. for 24 h.

Example 9

PDMS-co-PMES-g-polymethoxy ethyl methacrylate (PMEMA) is synthesized as follows. Initially, 20 g of PMHS-co-PDMS, which is available from Gelest, Inc. as product # HMS-082 (7-8 wt. % Methylhydrosiloxane-dimethylsiloxane copolymer, trimethylsiloxane terminated, 110-150 cs) and 4 g of allyl isobutyryl bromide are added to dry toluene in a flask under nitrogen purge and Karstedt's catalyst is added to this mixture. The temperature is raised to 90° C. and the reaction continued for 8 h. After the reaction, the solvent is evaporated. 20 g of the isobutyryl functionalized polysiloxane is dissolved in 150 ml of dry THF in a schlenk flask under nitrogen purge. 8.3 ml of methoxy ethyl methacrylate is added to the flask followed by 0.41 g copper (I) bromide and 0.6 ml of ligand, N,N,N',N',N''-pentamethyl-diethylenetriamine. The mixture is subjected to three freeze-thaw pump cycles and then allowed to polymerize at 90° C. for 72 h. After polymerization, the polymer is recovered by precipitating it into methanol and then filtering it. The polymer is dissolved in toluene and passed through a neutral alumina column to remove the catalyst, precipitated into methanol, filtered and dried. The number average molecular weight is 15500.

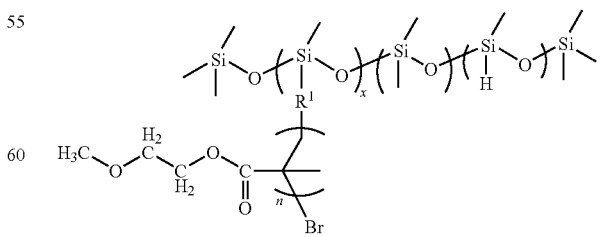

where n varies from 10 to 20 and x varies from 4 to 6

The PDMS-co-PMHS-g-PMEMA is used to prepare an ionene coating. 1 g of PDMS-co-PMHS-g-PMEMA and 0.05 g of Bis(dimethylamino)-dimethylsilane is dissolved in toluene and deposited into microtitre plate wells. The ionene polymer is cured at ambient temperature for 8 h and further cured at 50° C. for 24 h.

Example 10

PDMS-co-PMHS-g-PMEMA-b-PTMA is synthesized as follows. Initially, 20 g of PMHS-co-PDMS, which is available from Gelest, Inc. as product # HMS-082 (7-8 wt. % Methylhydrosiloxane-dimethylsiloxane copolymer, trimethylsiloxane terminated, 110-150 cs) and 4 g of allyl isobutyryl bromide are added to dry toluene in a flask under nitrogen purge and Karstedt's catalyst is added to this mixture. The temperature is raised to 90° C. and the reaction continued for 8 h. After the reaction, the solvent is evaporated. 20 g of the isobutyryl functionalized polysiloxane is dissolved in 150 ml of dry THF in a schlenk flask under nitrogen purge. 6.4 ml of methoxy ethyl methacrylate is added to the flask followed by 0.32 g copper (I) bromide and 0.46 ml of ligand, N,N,N',N',N"-pentamethyl-diethylenetriamine. The mixture is subjected to three freeze-thaw pump cycles and then allowed to polymerize at 90° C. for 72 h. After 72 h, 15.7 g methacrylate functionalized triclosan (biocide) is added to the reaction mixture under nitrogen purge and the polymerization continued at 90° C. for another 72 h. After polymerization, the polymer is recovered by precipitating it into methanol and then filtering it. The polymer is dissolved in toluene and passed through a neutral alumina column to remove the catalyst, precipitated into methanol, filtered and dried. The number average molecular weight is 21000.

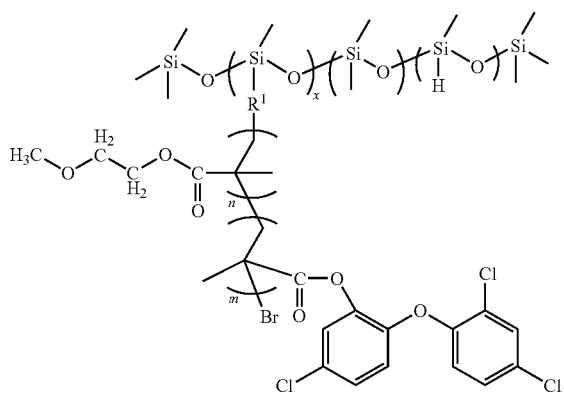

where n varies from 10 to 20, m varies from 15 to 20 and x varies from 4 to 6

The PDMS-co-PMHS-g-PMEMA-b-PTMA is used to prepare an ionene coating. 1 g of PDMS-co-PMHS-g-PMEMA-b-PTMA and 0.03 g of Bis(dimethylamino)-dimethylsilane is dissolved in toluene and deposited into microtitre plate wells. The ionene polymer is cured at ambient temperature for 8 h and further cured at 50° C. for 24 h.

Example 11

PDMS-co-PMHS-g-PHDFMA-b-PTMA is synthesized as follows. Initially, 20 g of PMHS-co-PDMS, which is available from Gelest, Inc. as product # HMS-082 (7-8 wt. % Methylhydrosiloxane-dimethylsiloxane copolymer, trimethylsiloxane terminated, 110-150 cs) and 4 g of allyl isobutyryl bromide are added to dry toluene in a flask under nitrogen purge and Karstedt's catalyst is added to this mixture. The temperature is raised to 90° C. and the reaction continued for 8 h. After the reaction, the solvent is evaporated. 20 g of the isobutyryl functionalized polysiloxane is dissolved in 150 ml of dry THF in a schlenk flask under nitrogen purge. 7.4 ml of heptadecafluoro decyl methacrylate is added to the flask followed by 0.32 g copper (I) bromide and 0.46 ml of ligand, N,N,N',N',N"-pentamethyl-diethylenetriamine. The mixture is subjected to three freeze-thaw pump cycles and then allowed to polymerize at 90° C. for 8 h. After 8 h, 15.7 g methacrylate functionalized triclosan (biocide) is added to the reaction mixture under nitrogen purge and the polymerization continued at 90° C. for another 72 h. After polymerization, the polymer is recovered by precipitating it into methanol and then filtering it. The polymer is dissolved in toluene and passed through a neutral alumina column to remove the copper catalyst, precipitated into methanol, filtered and dried. The number average molecular weight is 20000.

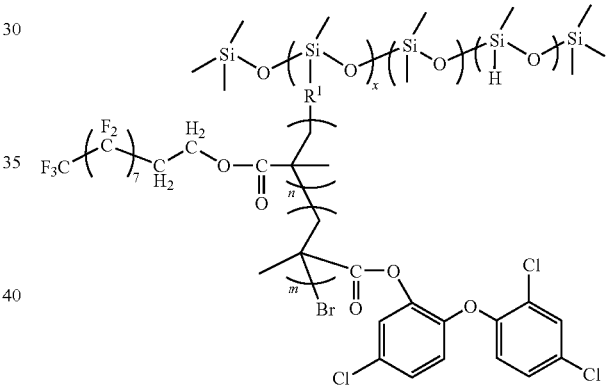

where n varies from 10 to 20, m varies from 15 to 20 and x varies from 4 to 6.

The PDMS-co-PMHS-g-PHDFMA-b-PTMA is used to prepare an ionene coating. 1 g of PDMS-co-PMHS-g-PHDFMA-b-PTMA and 0.06 g of Bis(dimethylamino)-dimethylsilane is dissolved in toluene and deposited into microtitre plate wells. The ionene polymer is cured at ambient temperature for 8 h and further cured at 50° C. for 24 h.

Example 12

PDMS-co-PMHS-g-PMEMA-b-PHDFMA is synthesized as follows. Initially, 20 g of PMHS-co-PDMS, which is available from Gelest, Inc. as product # HMS-082 (7-8 wt. % Methylhydrosiloxane-dimethylsiloxane copolymer, trimethylsiloxane terminated, 110-150 cs) and 4 g of allyl isobutyryl bromide are added to dry toluene in a flask under nitrogen purge and Karstedt's catalyst is added to this mixture. The temperature is raised to 90° C. and the reaction continued for 8 h. After the reaction, the solvent is evaporated. 10 g of the isobutyryl functionalized polysiloxane is dissolved in 100 ml of dry THF in a schlenk flask under nitrogen purge. 3.2 ml of methoxy ethyl methacrylate is added to the flask followed by 0.08 g copper (I) bromide and 0.11 ml of ligand, N,N,N',N', N"-pentamethyl-diethylenetriamine. The mixture is subjected to three freeze-thaw pump cycles and then allowed to polymerize at 90° C. for 72 h. After 72 h, 3.7 ml of heptadecafluoro decyl methacrylate is added to the reaction mixture under nitrogen purge and the polymerization continued at 90° C. for another 24 h. After polymerization, the polymer is recovered by precipitating it into methanol and then filtering it. The polymer is dissolved in toluene and passed through a neutral alumina column to remove the copper catalyst, precipitated into methanol, filtered and dried. The number average molecular weight is 21000.

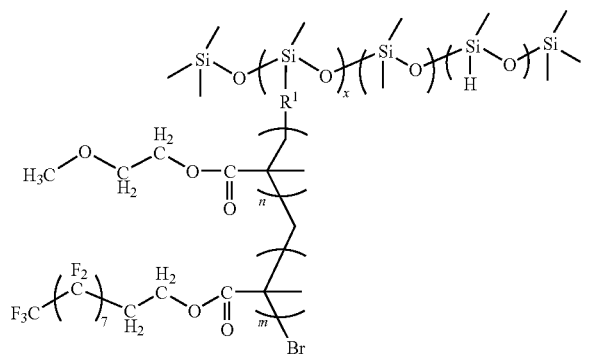

where n varies from 10 to 20, m varies from 10 to 15, and x varies from 4 to 6

The PDMS-co-PMHS-g-PMEMA-b-PHDFMA is used to prepare an ionene coating. 1 g of PDMS-co-PMHS-g-PMEMA-b-PHDFMA and 0.05 g of Bis(dimethylamino)-dimethylsilane is dissolved in toluene and deposited into microtitre plate wells. The ionene polymer is cured at ambient temperature for 8 h and further cured at 50° C. for 24 h.

Example 13

PDMS-co-PMHS-g-PHDFMA-b-PMEMA is synthesized as follows. Initially, 20 g of PMHS-co-PDMS, which is available from Gelest, Inc. as product # HMS-082 (7-8 wt. % Methylhydrosiloxane-dimethylsiloxane copolymer, trimethylsiloxane terminated, 110-150 cs) and 4 g of allyl isobutyryl bromide are added to dry toluene in a flask under nitrogen purge and Karstedt's catalyst is added to this mixture. The temperature is raised to 90° C. and the reaction continued for 8 h. After the reaction, the solvent is evaporated. 10 g of the isobutyryl functionalized polysiloxane is dissolved in 100 ml of dry THF in a schlenk flask under nitrogen purge. 3.7 ml of heptadecafluoro decyl methacrylate is added to the flask followed by 0.08 g copper (I) bromide and 0.11 ml of ligand, N,N,N',N',N"-pentamethyl-diethylenetriamine. The mixture is subjected to three freeze-thaw pump cycles and then allowed to polymerize at 90° C. for 8 h. After 8 h, 3.2 ml of methoxy ethyl methacrylate is added to the reaction mixture under nitrogen purge and the polymerization continued at 90° C. for another 72 h. After polymerization, the polymer is recovered by precipitating it into methanol and then filtering it. The polymer is dissolved in toluene and passed through a neutral alumina column to remove the copper catalyst, precipitated into methanol, filtered and dried. The number average molecular weight is 21000.

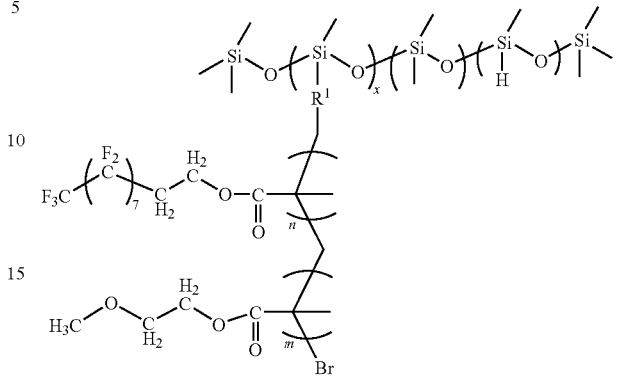

where n varies from 15 to 20, m varies from 10 to 15, and x varies from 4 to 6

The PDMS-co-PMHS-g-PHDFMA-b-PMEMA is used to prepare an ionene coating. 1 g of PDMS-co-PMHS-g-PHDFMA-b-PMEMA and 0.05 g of Bis(dimethylamino)-dimethylsilane is dissolved in toluene and deposited into microtitre plate wells. The ionene polymer is cured at ambient temperature for 8 h and further cured at 50° C. for 24 h.

Example 14

10 g of hydride terminated polydimethyl siloxane (PDMS) and 0.5 g of allyl isobutyryl bromide are added to dry toluene in a flask under nitrogen purge. Karstedt's catalyst is added to this mixture. The temperature is raised to 90° C. and the reaction continued for 8 h. After the reaction, the solvent is evaporated and the isobutyryl functionalized PDMS is added to a schlenk tube under nitrogen purge followed by dry THF. 8 g of acrylate functionalized 1,3 dichloropropanol, is combined with the catalyst copper bromide and ligand N,N,N',N', N"-pentamethyl-diethylenetriamine in the flask and subjected to three freeze-thaw pump cycles. After the freeze-thaw pump cycles, the temperature is raised to 90° C. and the polymerization continued for 48 h. After polymerization, polymer is recovered by precipitating into methanol and filteration. The polymer is dissolved in toluene and passed through a neutral alumina column to remove the catalyst, precipitated into methanol, filtered and dried.

Scheme 4

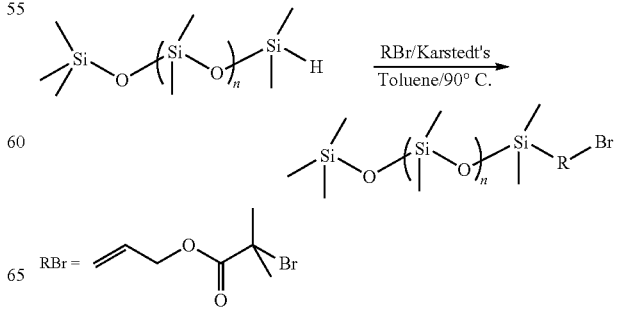

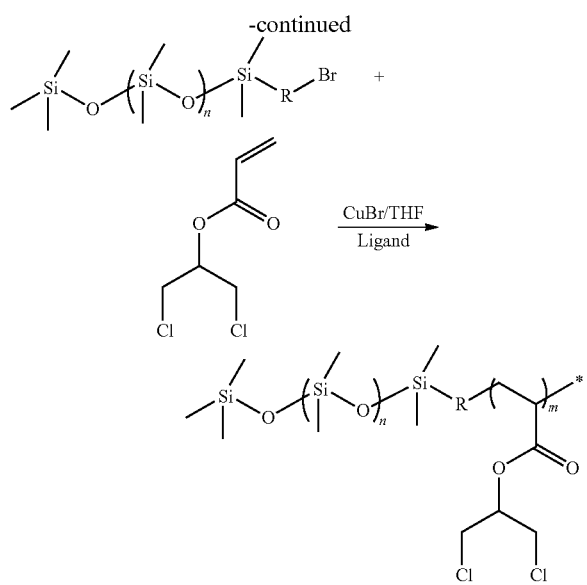

where n varies between 20-30 and m varies between 10-15

The dihalide functionalized polymer is used to prepare an ionene coating. 1 g of the dihalide functionalized polymer and 0.1 g of bis(dimethylamino)-dimethylsilane is dissolved in toluene and deposited into microtitre plate wells. The ionene polymer is cured at ambient temperature for 8 h and further cured at 50° C. for 24 h.

Example 15

A bioassay is carried out according to the procedure described in Katherine Merritt, Anita Gaind and James M. Anderson, Detection of Bacterial Adherence on Biomedical Polymers, Journal of Biomedical Material Research, 1998, 39, 415-422, which is incorporated herein by reference in it entirety. In general terms, the procedure uses a dye elution technique to measure the adherence of organisms to polymers. The technique involves growing organisms (e.g., bacteria) on the surface of the coatings, staining with crystal violet, eluting the dye with ethanol, and determining the optical density of the solution using 96-well plates and an enzyme immunosorbent assay reader with a 540 nm filter.

Figure 3:
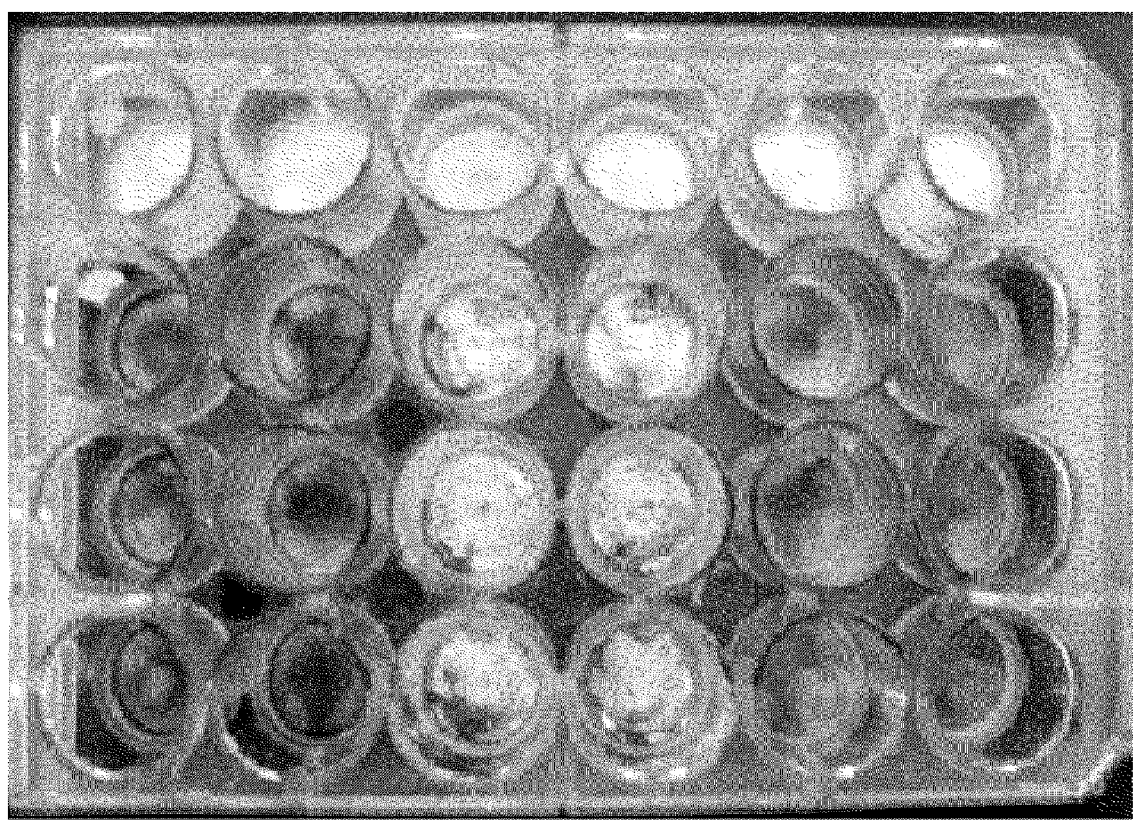
FIG. 3 is a picture of a number of coatings after they have been stained with crystal violet to show adhered Halomonas Pacifica bacteria.

Referring to FIG. 3, a picture is shown of a number of coatings after they have been stained with crystal violet. The organism used in these tests is the bacteria Halomonas Pacifica. In general, darker stains indicate that more bacteria has adhered to the particular coating than lighter stains.

The row of samples across the top represent control samples that did not have any organisms placed in them. The two vertical rows on the left were used to test a commercial coating sold by Dow Corning as DC 3140 silicon adhesive. The two rows in the center were used to test the ionene coating prepared according to Example 8 above. The two vertical rows on the right were used to test polymethyl methacrylate. As shown in FIG. 3, the coating prepared according to Example 8 above is noticeably superior to the other two tested coatings.

Figure 4:
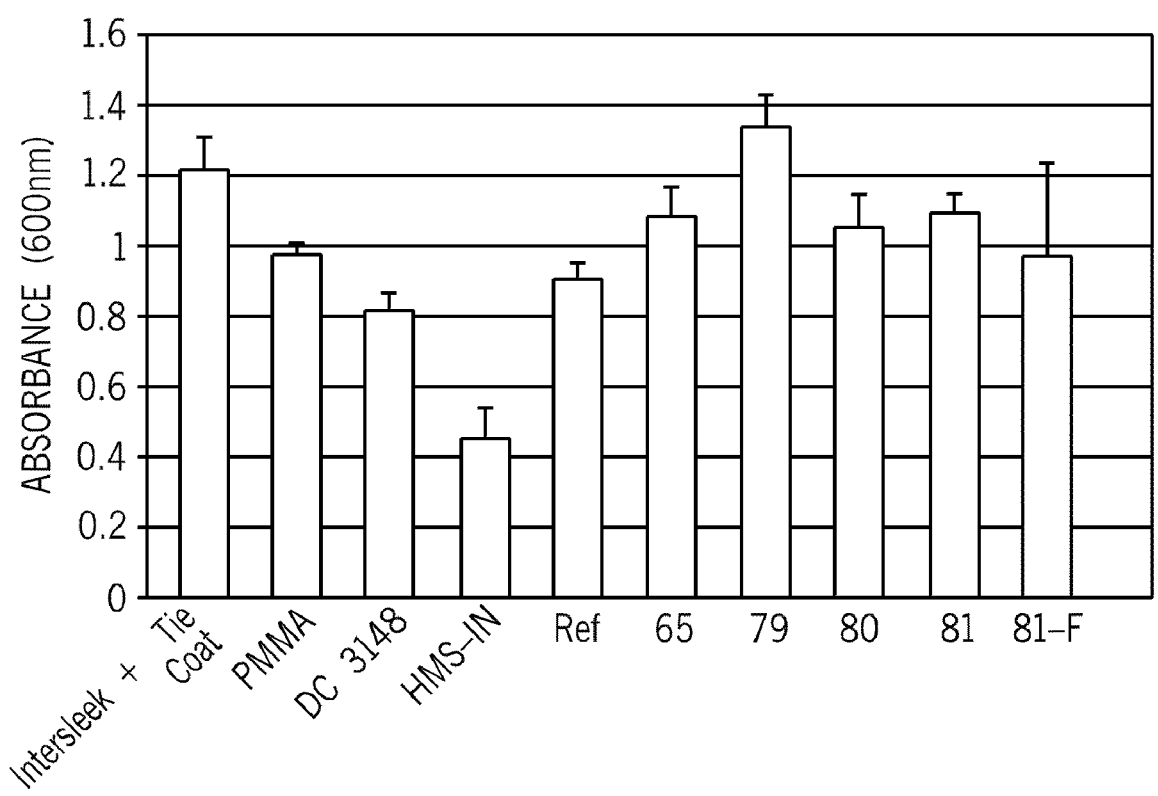
FIG. 4 is a chart showing the fouling resistance properties of various coatings.

The coatings shown in FIG. 4 are tested according to this method using the bacteria Halomonas Pacifica. For each coating, the absorbance of the eluted dye solution is measured and the results are shown in FIG. 4. In general, the coatings showing the lowest light absorbance are the coatings that were most resistant to adherence by the organisms.

The coatings are:
Intersleek+Tie Coat=Intersleek 425 available from International Paint Ltd.
PMMA=polymethyl methacrylate
DC 3140=silicon adhesive available from Dow Corning.
HMS-IN=coating prepared according to Example 8 above.
Ref=PDMS
65=PDMS-co-PMHS-g-PHDFMA, Mn=25000, cross linked with divinyl siloxane in THF solvent.
79=PDMS-co-PMHS-g-PHDFMA, Mn=12000, cross linked with divinyl siloxane in THF solvent.
80=PDMS-co-PMHS-g-PHDFMA, Mn=15000, cross linked with divinyl siloxane in THF solvent.
81=PDMS-co-PMHS-g-PHDFMA, Mn=20000, cross linked with divinyl siloxane in THF solvent.
81-F=PDMS-co-PMHS-g-PHDFMA, Mn=20000, cross linked with divinyl siloxane in fluorinated solvent.

FIG. 4 shows that the ionene coating inhibits growth and/or adherence of the organisms on the coating to a greater degree than the other coatings.

Figure 5:
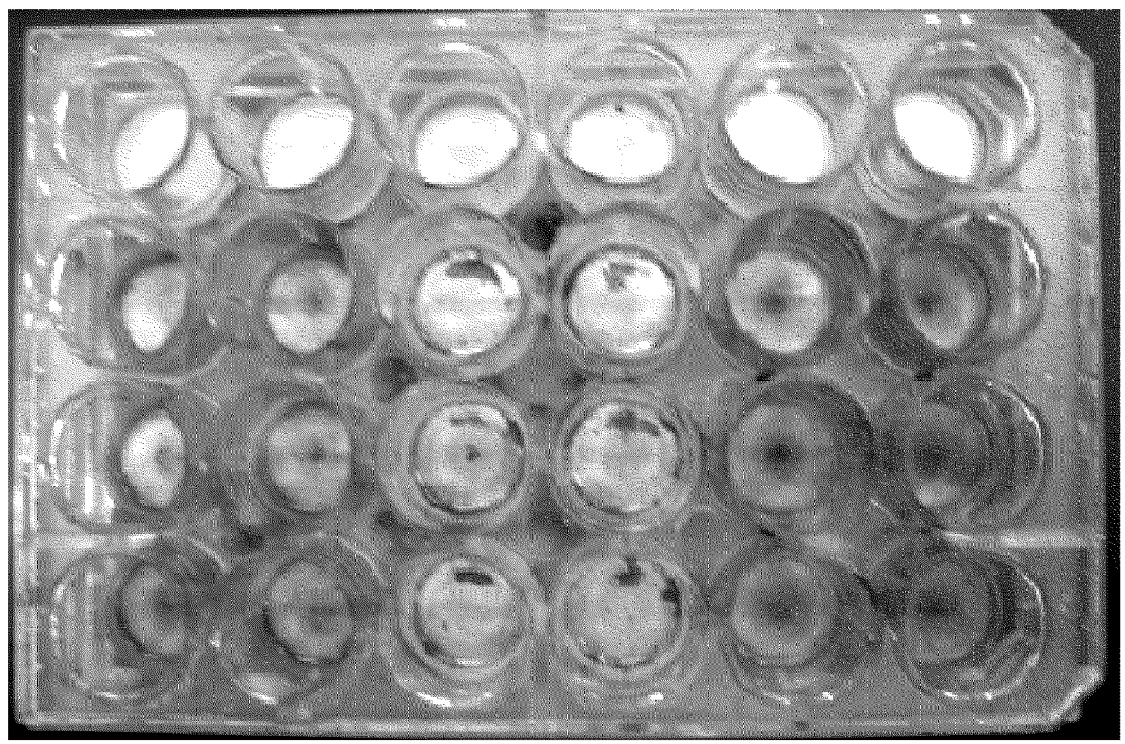
FIG. 5 is another picture of a number of coatings after they have been stained with crystal violet to show adhered Cytophaga Lytica bacteria.

FIG. 5 shows another picture where the same coatings as those shown in FIG. 3 are tested using Cytophaga Lytica bacteria. Cytophaga Lytica is known to induce macrofouling on previous coatings. FIG. 5 also shows that the coating prepared according to Example 8 above inhibited the growth and/or adherence of organisms on the surface of the coating.

The invention has been described with reference to various specific and illustrative embodiments and techniques. However, it should be understood that many variations and modifications may be made while remaining within the spirit and scope of the invention.

What is claimed is:

1. A polyamine cross-linked polysiloxane which is prepared by cross linking a copolymer using a polyamine, wherein the copolymer has the formula:

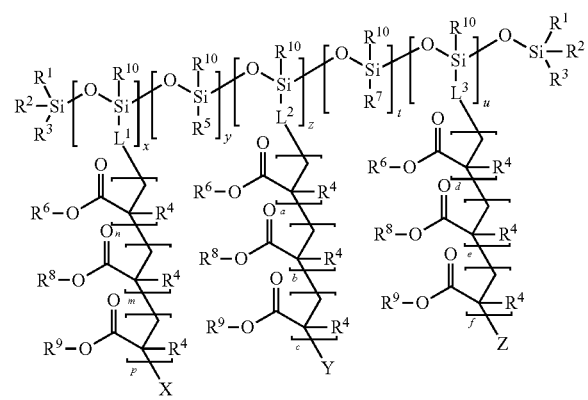

wherein x is an integer from 0 to 100;
y is an integer from 0 to 100;
z is an integer from 0 to 100,
t is an integer from 0 to 100;
u is an integer from 0 to 100;
x+y+z+t+u is at least 5;
at least one of u, x and z is not zero;
n is an integer from 0 to 50;
m is an integer from 0 to 50;
p is an integer from 0 to 50;
a is an integer from 0 to 50;
b is an integer from 0 to 50;
c is an integer from 0 to 50;

d is an integer from 0 to 50;
e is an integer from 0 to 50;
f is an integer from 0 to 50;
at least one of n, m, p, a, b, c, d, e and f is not zero;
X is a halide or an end cap group;
Y is a halide or an end cap group;
Z is a halide or an end cap group;
$L^1$, $L^2$, and $L^3$ are linking groups;
$R^1$, $R^2$, $R^3$, and $R^{10}$ are independently $C_1$-$C_{10}$ alkyl, cyclopentyl, cyclohexyl, benzyl, toluoyl, xylyl or phenyl;
$R^4$ is hydrogen, $C_1$-$C_{10}$ alkyl, cyclopentyl, cyclohexyl, benzyl, toluoyl, xylyl, or phenyl;
$R^5$ is $C_1$-$C_{10}$ alkyl, cyclopentyl, cyclohexyl, benzyl, toluoyl, xylyl, phenyl, or a cross linking group;
$R^7$ is hydrogen, $C_1$-$C_{10}$ alkyl, cyclopentyl, cyclohexyl, benzyl, toluoyl, xylyl, phenyl, or a cross linking group;
$R^6$, $R^8$, and $R^9$ include independently a biocidal group that is toxic to organisms that cause fouling in an aquatic environment; a fouling release group; a texturizing group; or combination thereof.

2. The polyamine cross-linked polysiloxane of claim 1 wherein the copolymer has a formula:

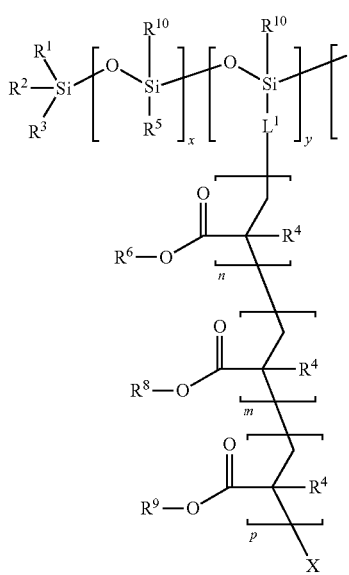

wherein x is an integer from 0 to 100;
y is an integer from 1 to 100;
z is an integer from 0 to 100;
x+y+z is at least 5
n is an integer from 0 to 50;
m is an integer from 0 to 50;
p is an integer from 0 to 50;
X is a halide;
$L^1$ is a linking group;
$R^1$, $R^2$, $R^3$ and $R^{10}$ are independently $C_1$-$C_{10}$ alkyl, cyclopentyl, cyclohexyl, benzyl, toluoyl, xylyl or phenyl;
$R^4$ is hydrogen, $C_1$-$C_{10}$ alkyl, cyclopentyl, cyclohexyl, benzyl, toluoyl, xylyl, phenyl;
$R^5$ is $C_1$-$C_{10}$ alkyl, cyclopentyl, cyclohexyl, benzyl, toluoyl, xylyl, phenyl, or a cross linking group;
$R^7$ is hydrogen, $C_1$-$C_{10}$ alkyl, cyclopentyl, cyclohexyl, benzyl, toluoyl, xylyl, phenyl, or a cross linking group; and
$R^6$, $R^8$, and $R^9$ are independently a biocidal group that is toxic to organisms that cause fouling in an aquatic environment; a fouling release group; a texturizing group; or combination thereof.

3. The polyamine cross-linked polysiloxane of claim 2 wherein m is 0; p is 0; $R^1$, $R^2$, $R^3$, $R^5$ and $R^{10}$ are methyl; $R^4$ is hydrogen or methyl; $R^7$ is hydrogen or methyl; and $R^6$ includes a group represented by the formula:

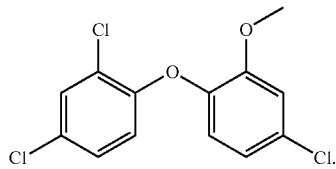

4. The polyamine cross-linked polysiloxane of claim 2 wherein $R^1$, $R^2$, $R^3$, $R^5$ and $R^{10}$ are methyl; $R^4$ is hydrogen or methyl; $R^7$ is hydrogen or methyl; and $R^6$ includes a biocidal group.

5. The polyamine cross-linked polysiloxane of claim 2 wherein the polyamine comprises polyalkylenepolyamine having the following formula:

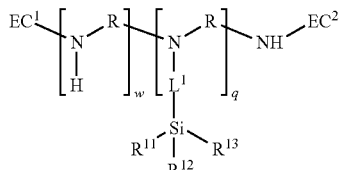

wherein w is an integer from 0 to 125;
q is an integer from 0 to 25;
w+q is at least 3 and no more than about 500;
$EC^1$ and $EC^2$ are end cap groups;
$L^1$ is a linking group;
R is alkylene;
$R^{11}$ is alkoxy;
$R^{12}$ and $R^{13}$ are independently alkoxy or alkyl.

6. The polyamine cross-linked polysiloxane of claim 5, wherein R is ethylene or propylene; $R^{11}$ and $R^{12}$ are methoxy; at least one of $EC^1$ and $EC^2$ is —$SiR^{11}R^{12}R^{13}$; and the polyalkylenepolyamine has an average molecular weight of at least about 500 g/mol.

7. The polyamine cross-linked polysiloxane of claim 5, wherein $L^1$ is alkylene having 2 to 6 carbon atoms.

8. The polyamine cross-linked polysiloxane of claim 5, wherein $EC^1$ and $EC^2$ are independently H, trialkoxysilylalkyl, or dialkoxyalkylsilylalkyl.

9. The polyamine cross-linked polysiloxane of claim 2, wherein the polyamine comprises bis(dimethylamino)-dimethylsilane.

10. The polyamine cross-linked polysiloxane of claim 1 wherein the polyamine cross-linked polysiloxane further comprises one or more covalently-bound biocidal groups, which are toxic to organisms that cause fouling in an aquatic environment.

11. The polyamine cross-linked polysiloxane of claim 1 wherein the polyamine cross-linked polysiloxane comprises polyalkylenepolyamine subunits, which have an average molecular weight of at least about 500 g/mol.

12. A polymer coating comprising the polyamine cross-linked polysiloxane of claim 1.

13. A method of coating a substrate comprising:
applying a mixture, which includes a polyamine functionalized material and the copolymer having the formula shown in claim 1, to the substrate.

14. The polyamine cross-linked polysiloxane of claim 1 wherein the copolymer has a formula:

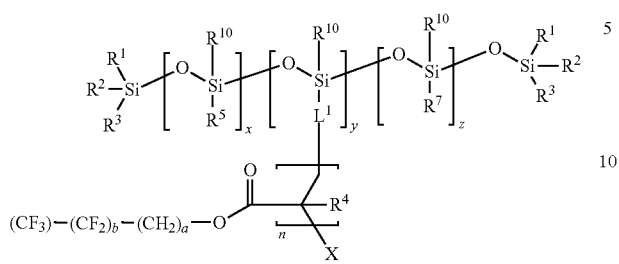

wherein x is an integer from 0 to 100;
y is an integer from 1 to 100;
z is an integer from 0 to 100;
x+y+z is at least 10;
n is an integer from 1 to 50;
a is 1, 2, or 3;
b is an integer from 1 to 15;
X is Cl and/or Br;
$L^1$ is a linking group;
$R^1, R^2, R^3$, and $R^{10}$ are independently $C_1$-$C_{10}$ alkyl, cyclopentyl, cyclohexyl, benzyl, toluoyl, xylyl or phenyl;
$R^4$ is hydrogen, $C_1$-$C_{10}$ alkyl, cyclopentyl, cyclohexyl, benzyl, toluoyl, xylyl, phenyl;
$R^5$ is $C_1$-$C_{10}$ alkyl, cyclopentyl, cyclohexyl, benzyl, toluoyl, xylyl, phenyl, or a cross linking group;
$R^7$ is hydrogen, $C_1$-$C_{10}$ alkyl, cyclopentyl, cyclohexyl, benzyl, toluoyl, xylyl, phenyl, or a cross linking group; and
the copolymer is a random or block copolymer.

15. A polymer coating comprising the polyamine cross-linked polysiloxane of claim 14.

16. The polyamine cross-linked polysiloxane of claim 14, wherein the polyamine comprises bis(dimethylamino)-dimethylsilane.

17. The polyamine cross-linked polysiloxane of claim 1 wherein at least one of $R^6$, $R^8$, and $R^9$ includes a biocidal group.

18. The polyamine cross-linked polysiloxane of claim 1 wherein the polyamine comprises polyalkylenepolyamine having the following formula:

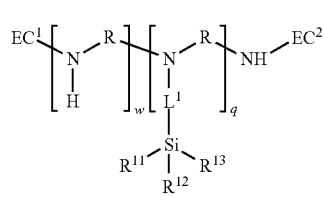

wherein w is an integer from 0 to 125;
q is an integer from 0 to 25;
w+q is at least 3 and no more than about 500;
$EC^1$ and $EC^2$ are end cap groups;
$L^1$ is a linking group;
R is alkylene;
$R^{11}$ is alkoxy;
$R^{12}$ and $R^{13}$ are independently alkoxy or alkyl.

19. The polyamine cross-linked polysiloxane of claim 18 wherein R is ethylene or propylene; $R^{11}$ and $R^{12}$ are methoxy; at least one of $EC^1$ and $EC^2$ is —$SiR^{11}R^{12}R^{13}$; and the polyalkylenepolyamine has an average molecular weight of at least about 500 g/mol.

20. The polyamine cross-linked polysiloxane of claim 1 wherein the copolymer is a random copolymer.

21. The polyamine cross-linked polysiloxane of claim 20, wherein the alkoxysilyl functionalized polyamine includes one or more dialkoxyalkylsilylalkyl groups and/or trialkoxysilylalkyl groups.

22. The polyamine cross-linked polysiloxane of claim 1, wherein the polyamine comprises alkoxysilyl functionalized polyamine with an average molecular weight of at least about 500 g/mol and no more than about 5,000 g/mol.

23. The polyamine cross-linked polysiloxane of claim 1, wherein the polyamine comprises bis(dimethylamino)-dimethylsilane.

* * * * *